United States Patent
Villanueva et al.

(10) Patent No.: US 10,960,785 B2
(45) Date of Patent: Mar. 30, 2021

(54) BATTERY THERMAL MANAGEMENT SYSTEM AND METHOD

(71) Applicant: Joby Aero, Inc., Santa Cruz, CA (US)

(72) Inventors: Ernest Villanueva, Santa Cruz, CA (US); Nathaniel Martin, Santa Cruz, CA (US); JoeBen Bevirt, Santa Cruz, CA (US); Jonathan Wagner, Santa Cruz, CA (US); Kevin Witt, Santa Cruz, CA (US); Brian Uznanski, Santa Cruz, CA (US); Austin Newman, Santa Cruz, CA (US)

(73) Assignee: Joby Aero, Inc., Santa Cruz, CA (US)

(*) Notice: Subject to any disclaimer, the term of this patent is extended or adjusted under 35 U.S.C. 154(b) by 0 days.

(21) Appl. No.: 16/857,003

(22) Filed: Apr. 23, 2020

(65) Prior Publication Data

US 2020/0339010 A1 Oct. 29, 2020

Related U.S. Application Data

(60) Provisional application No. 62/837,504, filed on Apr. 23, 2019.

(51) Int. Cl.
*B60L 58/26* (2019.01)
*H01M 10/613* (2014.01)
(Continued)

(52) U.S. Cl.
CPC ............ *B60L 58/26* (2019.02); *B64C 39/024* (2013.01); *H01M 2/1077* (2013.01); *H01M 10/613* (2015.04); *H01M 10/625* (2015.04); *H01M 10/63* (2015.04); *H01M 10/6551* (2015.04); *H01M 10/6552* (2015.04); *H01M 10/6568* (2015.04); *B60L 2200/10* (2013.01); *B64C 2201/021* (2013.01); *B64C 2201/042* (2013.01);
(Continued)

(58) Field of Classification Search
CPC .............. B60L 2200/10; H01M 10/63; H01M 10/6568; H01M 10/6552; H01M 10/613; H01M 2/1077; H01M 10/6551; H01M 10/625; H01M 2220/20; B64C 2201/042; B64C 2201/021; B64C 2201/141
See application file for complete search history.

(56) References Cited

U.S. PATENT DOCUMENTS

| | | | |
|---|---|---|---|
| 1,386,713 | A | 8/1921 | Leinweber et al. |
| 1,496,723 | A | 6/1924 | Miller |

(Continued)

FOREIGN PATENT DOCUMENTS

| | | | |
|---|---|---|---|
| CN | 102239321 A | 11/2011 | |
| CN | 102245878 A | 11/2011 | |

(Continued)

OTHER PUBLICATIONS

European Search Report for Application No. 15765064.9 dated Oct. 16, 2017.
(Continued)

*Primary Examiner* — Marthe Y Marc-Coleman
(74) *Attorney, Agent, or Firm* — Jeffrey Schox

(57) ABSTRACT

The battery thermal management system includes a battery pack, a circulation subsystem, and a heat exchanger. The system can optionally include a cooling system, a reservoir, a de-ionization filter, a battery charger, and a controller.

17 Claims, 17 Drawing Sheets

(51) Int. Cl.
*H01M 10/625* (2014.01)
*H01M 10/63* (2014.01)
*H01M 10/6552* (2014.01)
*H01M 10/6568* (2014.01)
*H01M 2/10* (2006.01)
*B64C 39/02* (2006.01)
*H01M 10/6551* (2014.01)

(52) U.S. Cl.
CPC ... *B64C 2201/141* (2013.01); *H01M 2220/20* (2013.01)

(56) References Cited

U.S. PATENT DOCUMENTS

| | | |
|---|---|---|
| 1,794,202 A | 2/1931 | Pickard |
| D171,509 S | 2/1954 | Lightbourn et al. |
| 2,868,476 A | 1/1959 | Schlieben |
| 2,969,935 A | 1/1961 | Price |
| 2,981,339 A | 4/1961 | Kaplan |
| 3,002,712 A | 10/1961 | Sterling |
| 3,035,789 A | 5/1962 | Young |
| 3,059,876 A | 10/1962 | Platt |
| 3,081,964 A | 3/1963 | Quenzler |
| 3,082,977 A | 3/1963 | Melvin |
| 3,089,666 A | 5/1963 | Quenzler |
| 3,136,499 A | 6/1964 | Kessler |
| 3,141,633 A | 7/1964 | MacKay |
| 3,159,361 A | 12/1964 | Weiland |
| 3,181,810 A | 5/1965 | Olson |
| 3,231,221 A | 1/1966 | Platt |
| 3,259,343 A | 7/1966 | Roppel |
| 3,350,035 A | 10/1967 | Schlieben |
| 3,360,217 A | 12/1967 | Trotter |
| 3,404,852 A | 10/1968 | Sambell et al. |
| 3,592,412 A | 7/1971 | Glatfelter |
| 3,693,910 A | 9/1972 | Aldi |
| 3,795,372 A | 3/1974 | Feldman |
| 3,834,654 A | 9/1974 | Miranda |
| 3,856,238 A | 12/1974 | Malvestuto |
| 4,022,405 A | 5/1977 | Peterson |
| 4,047,840 A | 9/1977 | Ravenhall et al. |
| 4,053,125 A | 10/1977 | Ratony |
| 4,146,199 A | 3/1979 | Wenzel |
| 4,263,786 A | 4/1981 | Eng |
| 4,356,546 A | 10/1982 | Whiteside et al. |
| 4,387,866 A | 6/1983 | Eickmann |
| 4,519,746 A | 5/1985 | Wainauski et al. |
| 4,742,760 A | 5/1988 | Horstman et al. |
| 4,784,351 A | 11/1988 | Eickmann |
| 4,799,629 A | 1/1989 | Mori |
| 4,914,657 A | 4/1990 | Walter et al. |
| 4,925,131 A | 5/1990 | Eickmann |
| 4,979,698 A | 12/1990 | Lederman |
| 4,982,914 A | 1/1991 | Eickmann |
| 5,031,858 A | 7/1991 | Schellhase et al. |
| 5,082,079 A | 1/1992 | Lissaman et al. |
| 5,085,315 A | 2/1992 | Sambell |
| 5,141,176 A | 8/1992 | Kress et al. |
| 5,184,304 A | 2/1993 | Huddle |
| 5,374,010 A | 12/1994 | Stone et al. |
| 5,405,105 A | 4/1995 | Kress |
| 5,419,514 A | 5/1995 | Duncan |
| 5,515,282 A | 5/1996 | Jackson |
| 5,715,162 A | 2/1998 | Daigle |
| 5,806,805 A | 9/1998 | Elbert et al. |
| 5,823,468 A | 10/1998 | Bothe |
| 5,839,691 A | 11/1998 | Lariviere |
| 5,842,667 A | 12/1998 | Jones |
| 5,868,351 A | 2/1999 | Stamps et al. |
| 5,899,085 A | 5/1999 | Williams |
| 6,098,923 A | 8/2000 | Peters |
| 6,254,032 B1 | 7/2001 | Bucher |
| 6,260,796 B1 | 7/2001 | Klingensmith |
| 6,276,633 B1 | 8/2001 | Balayn et al. |
| 6,286,783 B1 | 9/2001 | Kuenkler |
| 6,293,491 B1 | 9/2001 | Wobben |
| 6,343,127 B1 | 1/2002 | Billoud |
| 6,402,088 B1 | 6/2002 | Syrovy et al. |
| 6,474,604 B1 | 11/2002 | Carlow |
| 6,561,455 B2 | 5/2003 | Capanna |
| 6,625,033 B1 | 9/2003 | Steinman |
| 6,655,631 B2 | 12/2003 | Austen-Brown |
| 6,719,244 B1 | 4/2004 | Gress |
| 6,745,977 B1 | 6/2004 | Long et al. |
| 6,883,748 B2 | 4/2005 | Yoeli |
| 6,892,980 B2 | 5/2005 | Kawai |
| 7,048,505 B2 | 5/2006 | Segota et al. |
| 7,118,066 B2 | 10/2006 | Allen |
| 7,147,182 B1 | 12/2006 | Flanigan |
| 7,159,817 B2 | 1/2007 | Vandermey et al. |
| 7,219,013 B1 | 5/2007 | Young et al. |
| 7,263,630 B2 | 8/2007 | Sailer |
| 7,310,573 B2 | 12/2007 | Stickling |
| 7,318,565 B2 | 1/2008 | Page |
| 7,376,088 B2 | 5/2008 | Gambardella et al. |
| 7,802,754 B2 | 9/2010 | Karem |
| 7,822,516 B2 | 10/2010 | Yanaka et al. |
| 7,857,253 B2 | 12/2010 | Yoeli |
| 7,857,254 B2 | 12/2010 | Parks |
| 7,874,513 B1 | 1/2011 | Smith |
| 7,950,606 B2 | 5/2011 | Atkey et al. |
| 8,016,226 B1 | 9/2011 | Wood |
| 8,056,866 B2 | 11/2011 | De |
| 8,152,096 B2 | 4/2012 | Smith |
| 8,275,494 B1 | 9/2012 | Roth |
| 8,376,264 B1 | 2/2013 | Hong et al. |
| 8,469,306 B2 | 6/2013 | Kuhn |
| 8,485,464 B2 | 7/2013 | Kroo |
| 8,527,233 B2 | 9/2013 | McIntyre |
| 8,602,347 B2 | 12/2013 | Isaac et al. |
| 8,708,273 B2 | 4/2014 | Oliver |
| 8,733,690 B2 | 5/2014 | Bevirt et al. |
| 8,800,912 B2 | 8/2014 | Oliver |
| 8,849,479 B2 | 9/2014 | Walter |
| 8,998,125 B2 | 4/2015 | Hollimon et al. |
| 9,102,401 B2 | 8/2015 | Collins et al. |
| 9,128,109 B1 | 9/2015 | Oneill |
| 9,316,141 B2 | 4/2016 | Pilavdzic |
| 9,415,870 B1 | 8/2016 | Beckman et al. |
| 9,435,661 B2 | 9/2016 | Brenner et al. |
| 9,561,857 B2 | 2/2017 | Weber |
| 9,694,911 B2 | 7/2017 | Bevirt et al. |
| 9,771,157 B2 | 9/2017 | Gagne et al. |
| 9,786,961 B2 | 10/2017 | Dyer et al. |
| 9,855,819 B2 | 1/2018 | Ochocinski et al. |
| 9,944,386 B1 | 4/2018 | Reichert et al. |
| 10,029,808 B2 | 7/2018 | Blanding et al. |
| 10,046,855 B2 | 8/2018 | Bevirt et al. |
| 10,144,503 B1 | 12/2018 | Vander Lind et al. |
| 10,183,746 B2 | 1/2019 | McCullough et al. |
| 10,208,676 B2 | 2/2019 | Johnson et al. |
| 10,246,184 B2 | 4/2019 | Ragland |
| 10,247,100 B2 | 4/2019 | Leamy et al. |
| 10,287,011 B2 | 5/2019 | Wolff et al. |
| 10,364,036 B2 | 7/2019 | Tighe et al. |
| 10,407,164 B2 | 9/2019 | Blumer |
| 10,497,996 B1 | 12/2019 | Muniz et al. |
| 10,501,194 B2 | 12/2019 | Knapp et al. |
| 10,780,786 B2 | 9/2020 | Del Core |
| 2003/0038213 A1 | 2/2003 | Yoeli |
| 2003/0062443 A1 | 4/2003 | Wagner et al. |
| 2003/0080242 A1 | 5/2003 | Kawai |
| 2003/0085319 A1 | 5/2003 | Wagner et al. |
| 2003/0094537 A1 | 5/2003 | Austen-Brown |
| 2003/0106959 A1 | 6/2003 | Fukuyama |
| 2004/0126241 A1 | 7/2004 | Zha et al. |
| 2004/0195460 A1 | 10/2004 | Sailer |
| 2004/0245376 A1 | 12/2004 | Muren |
| 2004/0261428 A1 | 12/2004 | Murry et al. |
| 2005/0178879 A1 | 8/2005 | Mao |
| 2005/0230524 A1 | 10/2005 | Ishiba |
| 2006/0016930 A1 | 1/2006 | Pak |
| 2006/0097103 A1 | 5/2006 | Atmur |
| 2006/0113426 A1 | 6/2006 | Yoeli |

(56) References Cited

U.S. PATENT DOCUMENTS

| | | |
|---|---|---|
| 2006/0226281 A1 | 10/2006 | Walton |
| 2007/0221779 A1 | 9/2007 | Ikeda |
| 2008/0048065 A1 | 2/2008 | Kuntz |
| 2008/0205416 A1 | 8/2008 | Dechiara |
| 2008/0283673 A1 | 11/2008 | Yoeli |
| 2009/0008499 A1 | 1/2009 | Shaw |
| 2009/0084907 A1 | 4/2009 | Yoeli |
| 2009/0140102 A1 | 6/2009 | Yoeli |
| 2009/0159757 A1 | 6/2009 | Yoeli |
| 2009/0200431 A1 | 8/2009 | Konings et al. |
| 2009/0224095 A1 | 9/2009 | Cox et al. |
| 2009/0283629 A1 | 11/2009 | Kroetsch et al. |
| 2010/0025006 A1 | 2/2010 | Zhou |
| 2010/0072325 A1 | 3/2010 | Sambell |
| 2010/0076625 A1 | 3/2010 | Yoeli |
| 2010/0100260 A1 | 4/2010 | McIntyre et al. |
| 2010/0193644 A1 | 8/2010 | Karem |
| 2010/0264257 A1 | 10/2010 | Brunken |
| 2010/0270419 A1 | 10/2010 | Yoeli |
| 2010/0270435 A1 | 10/2010 | Karem |
| 2011/0001020 A1 | 1/2011 | Forgac |
| 2011/0042508 A1 | 2/2011 | Bevirt |
| 2011/0042509 A1 | 2/2011 | Bevirt et al. |
| 2011/0042510 A1 | 2/2011 | Bevirt et al. |
| 2011/0049306 A1 | 3/2011 | Yoeli |
| 2011/0049307 A1 | 3/2011 | Yoeli |
| 2011/0139923 A1 | 6/2011 | Papanikolopoulos et al. |
| 2011/0139939 A1 | 6/2011 | Martin et al. |
| 2011/0147533 A1 | 6/2011 | Goossen et al. |
| 2011/0284201 A1* | 11/2011 | Soenmez ............... B64F 1/364 165/287 |
| 2011/0315809 A1 | 12/2011 | Oliver |
| 2012/0025016 A1 | 2/2012 | Methven et al. |
| 2012/0061526 A1 | 3/2012 | Brunken |
| 2012/0091257 A1 | 4/2012 | Wolff et al. |
| 2012/0222441 A1 | 9/2012 | Sawada et al. |
| 2012/0234518 A1 | 9/2012 | Brodie et al. |
| 2012/0234968 A1 | 9/2012 | Smith |
| 2013/0132548 A1 | 5/2013 | Cabos |
| 2013/0164578 A1* | 6/2013 | Sweet ............... H01M 10/0413 429/82 |
| 2013/0201316 A1 | 8/2013 | Binder et al. |
| 2013/0204544 A1 | 8/2013 | Thomas |
| 2014/0039735 A1 | 2/2014 | Major et al. |
| 2014/0096501 A1 | 4/2014 | Pantalone et al. |
| 2014/0174707 A1 | 6/2014 | Lombardo et al. |
| 2014/0230761 A1 | 8/2014 | Pilavdzic |
| 2014/0277869 A1 | 9/2014 | King et al. |
| 2014/0299708 A1 | 10/2014 | Green et al. |
| 2014/0358333 A1 | 12/2014 | White et al. |
| 2015/0012154 A1 | 1/2015 | Senkel et al. |
| 2015/0056058 A1 | 2/2015 | Grissom et al. |
| 2015/0102659 A1 | 4/2015 | Liffring et al. |
| 2015/0136897 A1 | 5/2015 | Seibel et al. |
| 2015/0147181 A1 | 5/2015 | Henze et al. |
| 2015/0232178 A1 | 8/2015 | Reiter |
| 2015/0266571 A1 | 9/2015 | Bevirt et al. |
| 2015/0360794 A1 | 12/2015 | Certain et al. |
| 2016/0031555 A1 | 2/2016 | Bevirt et al. |
| 2016/0031556 A1 | 2/2016 | Bevirt et al. |
| 2016/0083073 A1 | 3/2016 | Beckman |
| 2016/0107501 A1 | 4/2016 | Johnston |
| 2016/0109882 A1 | 4/2016 | Ouellette et al. |
| 2016/0112151 A1 | 4/2016 | Chedas et al. |
| 2016/0144957 A1 | 5/2016 | Claridge et al. |
| 2016/0204488 A1* | 7/2016 | Arai ............... H01M 10/613 429/62 |
| 2016/0214723 A1 | 7/2016 | Fox et al. |
| 2016/0272312 A1 | 9/2016 | Mallard |
| 2016/0294882 A1 | 10/2016 | Michaels |
| 2016/0304194 A1 | 10/2016 | Bevirt et al. |
| 2016/0325841 A1 | 11/2016 | Beckman et al. |
| 2017/0101176 A1 | 4/2017 | Alber et al. |
| 2017/0104385 A1 | 4/2017 | Salamon et al. |
| 2017/0137132 A1 | 5/2017 | Wiegers et al. |
| 2017/0247126 A1 | 8/2017 | Blanding et al. |
| 2017/0274983 A1 | 9/2017 | Beckman et al. |
| 2017/0277152 A1 | 9/2017 | Liu et al. |
| 2017/0297431 A1 | 10/2017 | Epstein et al. |
| 2018/0105279 A1 | 4/2018 | Tighe et al. |
| 2018/0115029 A1* | 4/2018 | Ren ............... B60L 58/12 |
| 2018/0134400 A1 | 5/2018 | Knapp et al. |
| 2018/0148182 A1 | 5/2018 | Fagundes et al. |
| 2018/0183657 A1 | 6/2018 | Beilin et al. |
| 2018/0215475 A1 | 8/2018 | Hurt et al. |
| 2018/0237148 A1 | 8/2018 | Hehn et al. |
| 2018/0239366 A1 | 8/2018 | Cutler et al. |
| 2018/0244370 A1 | 8/2018 | Lombard |
| 2018/0251226 A1 | 9/2018 | Fenny et al. |
| 2018/0287234 A1 | 10/2018 | Melack et al. |
| 2018/0290736 A1 | 10/2018 | Mikic et al. |
| 2018/0305030 A1 | 10/2018 | Galzin |
| 2018/0319491 A1 | 11/2018 | Kearney-Fischer |
| 2018/0354615 A1 | 12/2018 | Groninga et al. |
| 2018/0356439 A1 | 12/2018 | Luo et al. |
| 2018/0358664 A1* | 12/2018 | Zhang ............... H01M 10/643 |
| 2018/0362166 A1 | 12/2018 | Marr et al. |
| 2019/0077219 A1 | 3/2019 | Frieling et al. |
| 2019/0202310 A1 | 7/2019 | Gebhart |
| 2019/0210740 A1 | 7/2019 | Luo |
| 2019/0214161 A1 | 7/2019 | Chen et al. |
| 2019/0316849 A1 | 10/2019 | Mendez Abrego et al. |
| 2019/0341659 A1* | 11/2019 | Terwilliger ............. H02J 7/0029 |
| 2019/0351740 A1 | 11/2019 | Filipkowski et al. |
| 2020/0140094 A1 | 5/2020 | White |
| 2020/0207477 A1 | 7/2020 | Ghesquiere et al. |
| 2020/0303789 A1 | 9/2020 | MacDonald et al. |
| 2020/0339010 A1 | 10/2020 | Villanueva et al. |
| 2020/0350668 A1 | 11/2020 | Rheaume |
| 2020/0355121 A1 | 11/2020 | O'Meallie et al. |
| 2020/0376927 A1 | 12/2020 | Rajaie et al. |
| 2020/0385127 A1 | 12/2020 | Devault |
| 2020/0391876 A1 | 12/2020 | Morrison |

FOREIGN PATENT DOCUMENTS

| | | |
|---|---|---|
| CN | 102407944 A | 4/2012 |
| CN | 102245878 B | 11/2013 |
| CN | 102239321 B | 7/2014 |
| CN | 103363993 B | 4/2016 |
| CN | 107042884 A | 8/2017 |
| CN | 107709161 A | 2/2018 |
| CN | 108349585 A | 7/2018 |
| DE | 102012104783 A1 | 12/2013 |
| EP | 0945841 A1 | 9/1999 |
| EP | 2423106 A2 | 2/2012 |
| EP | 3210885 A1 | 8/2017 |
| EP | 3315401 A1 | 5/2018 |
| EP | 3366583 A1 | 8/2018 |
| EP | 3499634 A1 | 6/2019 |
| EP | 3565083 A1 | 11/2019 |
| GB | 1271102 A | 4/1972 |
| JP | 2017154728 A | 9/2017 |
| WO | 03074924 A1 | 9/2003 |
| WO | 03086857 A1 | 10/2003 |
| WO | 2016034830 A1 | 3/2016 |
| WO | 2016189421 A1 | 12/2016 |
| WO | 2019001203 A1 | 1/2019 |

OTHER PUBLICATIONS

International Search Report and Written Opinion for Application No. PCT/US10/46500 dated Apr. 13, 2011.
International Search Report and Written Opinion for Application No. PCT/US15/21344 dated Sep. 11, 2015.
International Search Report and Written Opinion for Application No. PCT/US15/21350 dated Sep. 15, 2015.
International Search Report and Written Opinion for Application No. PCT/US2017/059809 dated Jul. 31, 2018.
International Search Report and Written Opinion for PCT Application No. PCT/US2019/039247 dated Sep. 13, 2019.
International Search Report and Written Opinion for PCT Application No. PCT/US2019035236 dated Aug. 20, 2019.

(56) References Cited

OTHER PUBLICATIONS

"Airfolds Blade Profile", Mecaflux Heliciel, Propeller & Wing, https://www.heliciel.com/en/aerodynamique-hydrodynamique/profils%20aile%20profil%20pale.htm.

"Inclined Flat Plate", Aerodynamics of the airplane, Feb. 13, 2016.

"International Search Report and Written Opinion of the ISA dated Dec. 4, 2019 for PCT/US19/51565."

"International Search Report and Written Opinion of the ISA, dated Jul. 24, 2019, for application No. PCT/US19/31863."

Denham, Jr., James W., et al., "Converging on a Precision Hover Control Strategy for the F35B Stovl Aircraft", AIAA Guidance, Navigation and Control Conference and Exhibit Aug. 18-21, 2006, Honolulu, Hawaii, Abstract only.

Falco, Gianluca , et al., "Loose and Tight GNSS/INS Integrations: Comparison of Performance Assessed in Real Urban Scenarios", Sensors (Basel) Feb. 2017; 17 (2): 225, https://www.ncbi.nlm.nih.gov/pmc/articles/PMC5335985/.

Gold, Phillip J., et al., "Design and Pilot Evaluation of the RAH-66 Comanche Selectable Control Modes", https://ntrs.nasa.gov/search.jsp?, N94-13322, pp. 419-431, Jul. 1, 1993.

Kim, Tae , "Reduction of Tonal Propeller Noise by Means of Uneven Blade Spacing", University of California, Irvine, Thesis, publication date 2016.

Saraf, A. Amit Kumar , et al., "Study of Flow Separation on Airfoil with Bump", International Journal of Applied Engineering Research ISSN 09773-4562, vol. 13, No. 16 (2018), pp. 128686-12872.

Sullivan, Brenda M., et al., "A Subject Test of Modulated Blade Spacing for Helicopter Main Rotors", Presented at the American Helicopter Society 58th Annual Forum, Montreal, Canada, Jun. 11-13, 2002, http://ntrs.nasa.gov/search.isp.

Yeh, Y.C. (Bob) , "Triple-Triple Redundant 777 Primary Flight Computer", 1996, IEEE, pp. 293-307 (Year: 1996).

Young, Larry A., "Conceptual Design Aspects of Three General Sub-Classes of Multi-Rotor Configurations: Distributed, Modular, and Hetergenerous", NASA Ames Research Center, Moffett Field, CA 94035, Published 2015, Computer Science.

Bevacqua, Mia , "Studies Show How to Modify HVAC Systems for Improved EV Range", https://m.futurecar.com/2301/Studies-Show-How-to-Modify-HVAC-Systems-for-Improved-EV-Range, May 27, 2018.

International Search Report and Written Opinion for application No. PCT/US20/052920 dated Dec. 9, 2020.

\* cited by examiner

FLUID CONNECTIONS

POWER CONNECTIONS

FLUID CONNECTIONS

POWER CONNECTIONS

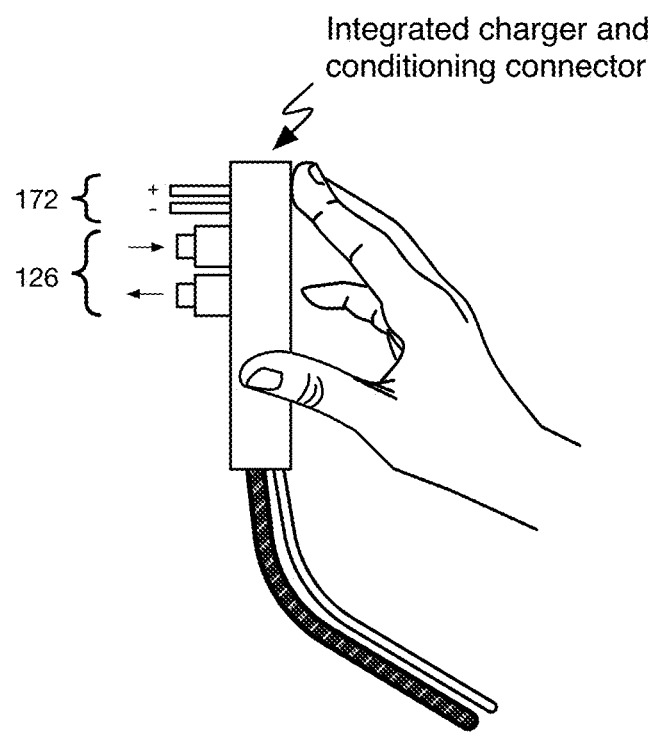
FIGURE 18
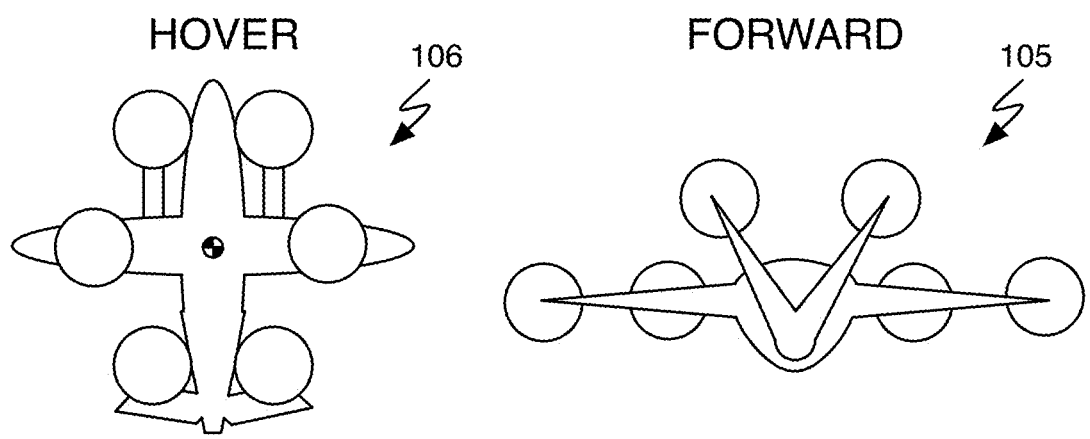
FIGURE 19A
FIGURE 19B

BATTERY THERMAL MANAGEMENT SYSTEM AND METHOD

CROSS-REFERENCE TO RELATED APPLICATIONS

This application claims the benefit of U.S. Provisional Application No. 62/837,504, filed 23 Apr. 2019, which is incorporated in its entirety by this reference.

This application is related to U.S. application Ser. No. 16/409,653, filed 10 May 2019, U.S. application Ser. No. 16/573,837, filed 17 Sep. 2019, each of which is incorporated in its entirety by this reference.

TECHNICAL FIELD

This invention relates generally to the battery technology field, and more specifically to a new and useful battery thermal management system and method in the battery technology field.

BACKGROUND

Electric vehicles use battery power to enable vehicle functions, such as propulsion and support systems. Modern battery technology requires careful thermal management during discharge to prevent undesired thermal events from disrupting optimal power delivery and, in some cases, damaging the battery and/or the vehicle itself. Inadequate thermal management of the battery can endanger the vehicle, its occupants, bystanders, and/or the surrounding environment. In addition, it is often desirable to charge the battery in a fast and efficient manner, which must be balanced against the heat generated within the battery by such charging processes. These challenges are compounded in contexts where the electric vehicle system design is subject to stringent constraints on weight, complexity, and/or safety, such as aviation.

Thus, there is a need in the battery technology field to create a new and useful battery thermal management system and method. This invention provides such new and useful systems and methods.

BRIEF DESCRIPTION OF THE FIGURES

FIG. 18 depicts an example of an integrated charging and conditioning connector for a variation of the battery thermal management system.

FIGS. 19A and 19B depict an example of a vehicle in the hover configuration and the forward configuration, respectively.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figure 1:
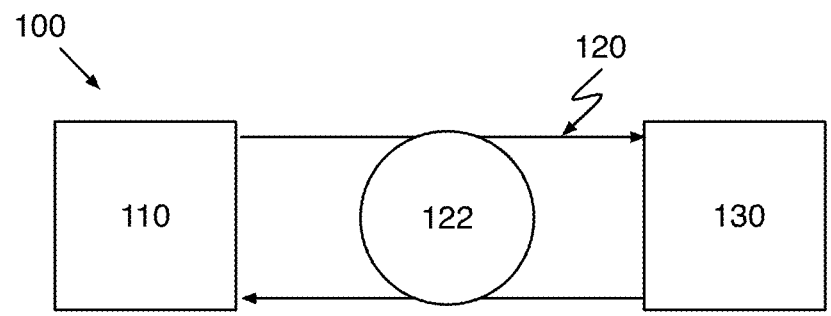
FIG. 1 depicts a variation of the battery thermal management system.

The battery thermal management system 100 includes a battery pack 110, a circulation subsystem 120, and a heat exchange system 130. The circulation subsystem includes: a pump 122 and a fluid manifold 124, and can optionally include a hose coupling 126 and a lockout mechanism 128. The system 100 can optionally include a cooling system 190, a reservoir 150, a de-ionization filter 160, a battery charger 170, and a controller 180. The system 100 can additionally or alternatively include any other suitable components. An example of the system 100 is shown in FIG. 1.

The system 100 functions to manage the thermal state of the battery pack. The thermal state can include the distribution of the temperature within the battery pack, the average temperature of the battery pack, the temperature rise or fall rate of the battery pack, and/or any other suitable metric quantifying the a temperature-related characteristic of all or part of the battery pack and/or thermally coupled elements.

The system 100 can also function to circulate a working fluid within the battery pack (e.g., to achieve temperature uniformity within the battery pack, to heat or cool the battery pack, etc.). The working fluid can be any suitable fluid that can be heated and/or cooled, and flowed through a closed or open circuit of the circulation subsystem to transfer heat among the various components (including, e.g., the external environment). The working fluid can additionally or alternatively be any suitable fluid medium for exchanging heat between portions of the battery pack and/or a heat exchanger of the system 100. For example, the working fluid can be water, a water/glycol mixture (e.g., 50/50, 70/30, 80/20, etc.), a refrigerant (e.g., R134a), an oil, air, fluid coolant, mineral oil, any other suitable gas or gas mixture, and/or any other suitable fluid. In variants, the working fluid can be a non-hazardous, natural, or bio-degradable fluid in order to minimize the environmental impact of leaks or spills. In variants, the working fluid can be non-conductive (e.g., mineral oil), which can eliminate the possibility of shorting electronics and/or enable flood cooling of the battery cells 114 (e.g., in a fully submersed configuration). In some examples, the system 100 can be configured to circulate multiple working fluids for various purposes (e.g., a first working fluid for cooling the battery pack circulated in parallel with a second working fluid for heating the battery pack, wherein the first and second working fluids can be circulated at differing times depending on the needs of the thermal management system, etc.).

The system 100 can also function to detect and manage a thermal event within the battery pack. A thermal event can include any off-nominal temperature reached by a portion of the battery pack. For example, a thermal event can include a thermal runaway in one or more cells 114 of a battery pack, wherein an uncontrolled, positive feedback exothermic reaction occurs within the cell or cells. A thermal event can also include thermal propagation, wherein an off-nominal (e.g., spiked, increasing, etc.) temperature spreads from one to multiple cells not initially affected. However, a thermal event can additionally or alternatively include any other temperature-related occurrence within the battery pack that requires mitigation to ensure proper battery pack operation (e.g., charging, discharging, storage, etc.).

The battery thermal management system can be used in conjunction with and/or include several related systems, in various embodiments. Such related systems can include an aircraft, aircraft subsystems (e.g., powertrain subsystems, propulsion subsystems, avionics subsystems, etc.), a ground-based vehicle (e.g., an automotive, a locomotive, etc.), land-based infrastructure (e.g., air traffic control systems, ground-based maintenance systems, etc.), and/or any other suitable systems.

Figure 2:
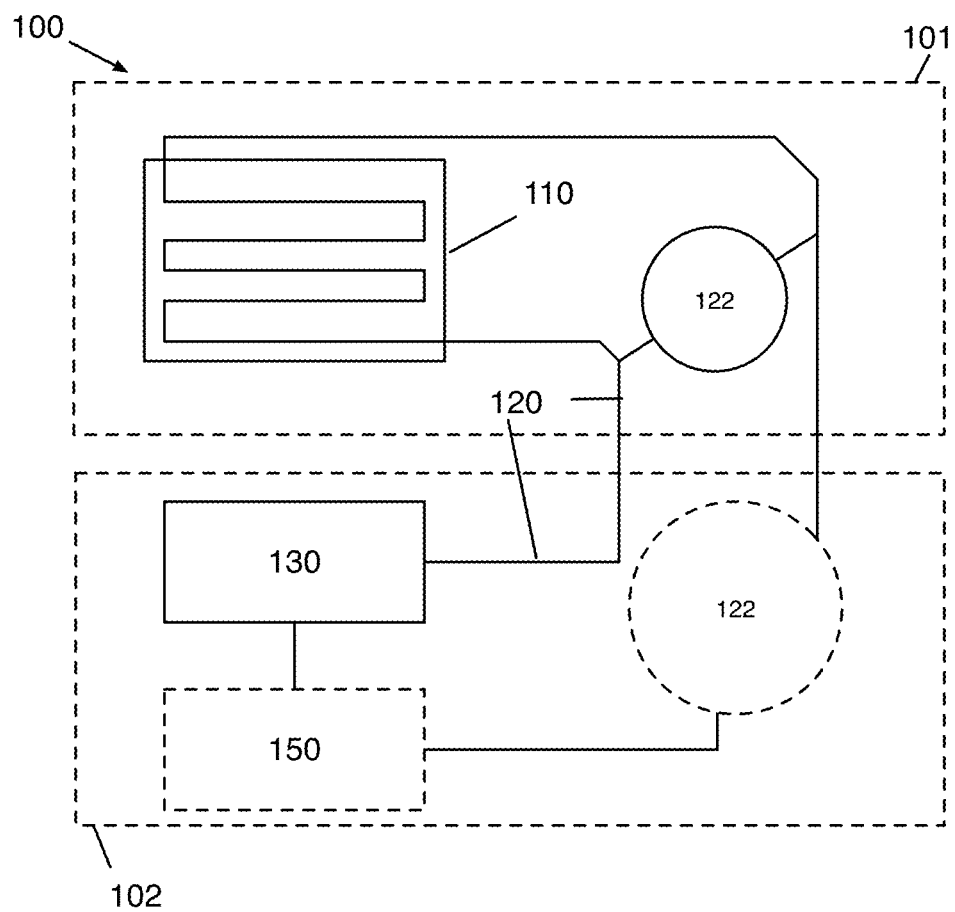
FIG. 2 depicts an example arrangement of elements of the battery thermal management system between an aircraft and a ground station.
Figure 17:
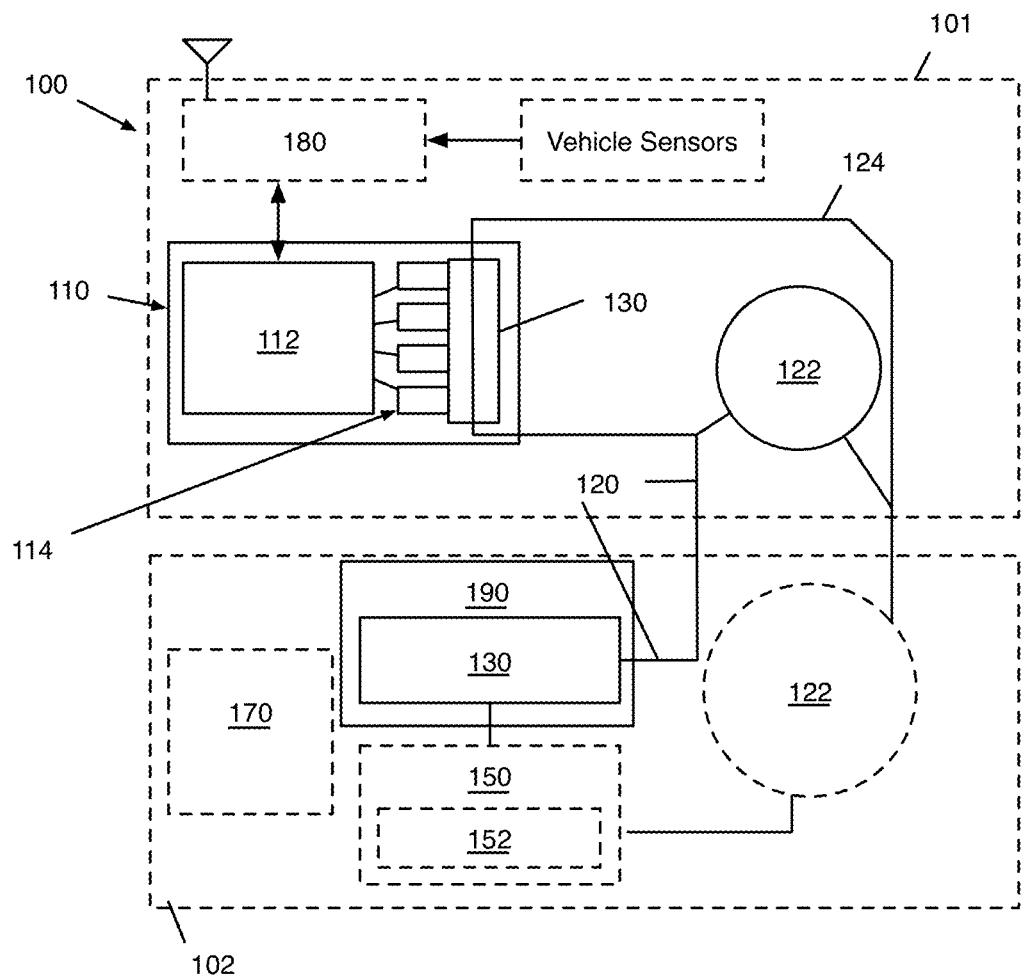
FIG. 17 depicts a variation of the battery thermal management system.

In variations of the system 100, components of the battery thermal management system are distributed between a vehicle and an infrastructure installation (examples shown in FIG. 2 and FIG. 17). The vehicle preferably includes the battery pack, a portion of the circulation subsystem, and can include an onboard pump. The infrastructure installation preferably includes the offboard heat exchanger (e.g., condenser and/or evaporator) and a complementary portion of the circulation subsystem, and can include an offboard pump and a reservoir. In specific examples, the vehicle excludes heavy components of the thermal conditioning system (e.g., components weighing more than 5%, 10%, 20%, etc. of the unloaded vehicle weight), such as the active cooling system, refrigeration system, or other active heat removal systems, wherein the excluded components are arranged within the infrastructure installation.

This distribution functions to enable thermal conditioning of the battery pack located on board the vehicle without requiring the vehicle to transport the components used for thermal conditioning during operation (e.g., flight, driving, traversing water, etc.). This allows the heat exchanger to be left behind during vehicle operation (e.g., enabling more efficient vehicle operation due to the reduced part count and weight). This distribution also enables a larger or more complex heat exchangers to be used to enable rapid charging of the battery pack on board the vehicle. The infrastructure installation can be static (e.g., fixed to the ground as part of substantially permanent infrastructure) or mobile (e.g., a movable/towable trailer that can be transported to a service area to be connected to the vehicle during charging or other thermal conditioning).

Figure 4:
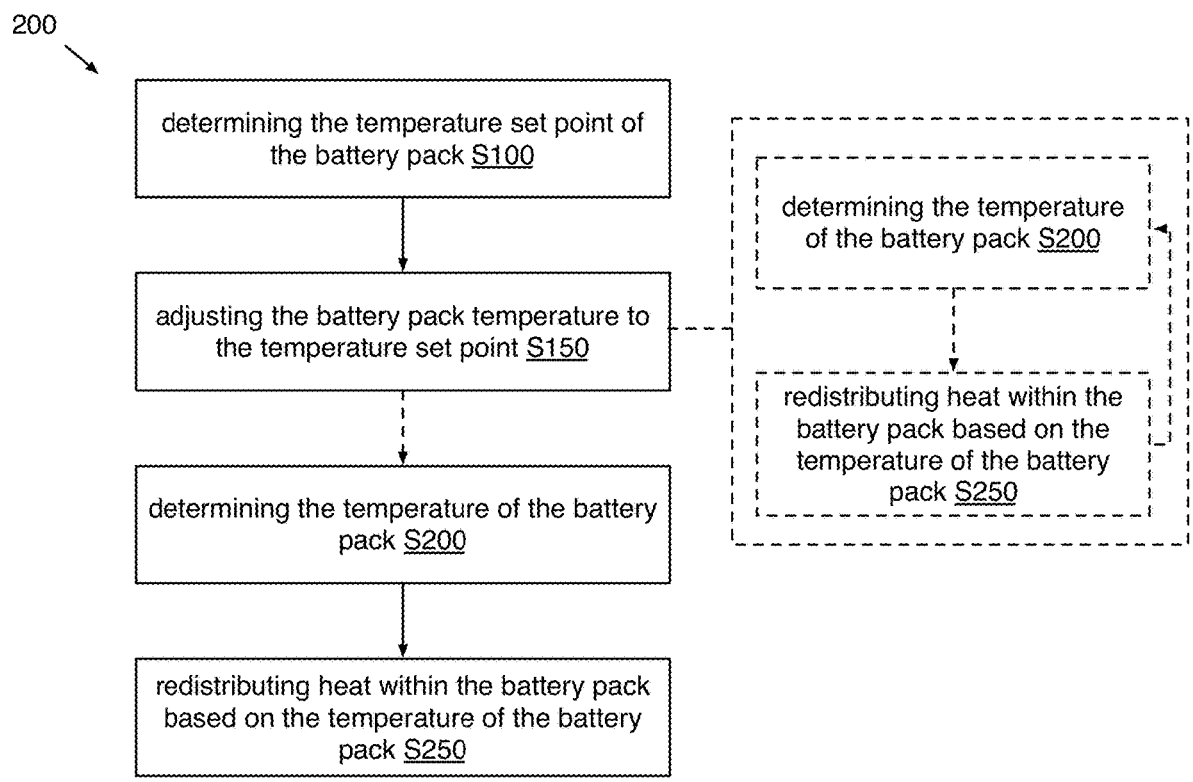
FIG. 4 depicts a flowchart of a variation of the battery thermal management method.

As shown in FIG. 4, the battery thermal management method 200 can include: determining the temperature setpoint of the battery pack S100 and adjusting the battery pack temperature to the temperature setpoint S150. The method can additionally or alternatively include: determining the temperature of the battery pack S200; and redistributing heat within the battery pack S250. The method 200 can additionally or alternatively include any other suitable processes.

The method 200 functions to manage the thermal state of the battery pack associated with the vehicle. The method 200 can also function to implement the functionality of any component or components of a system analogous to the system 100, as described herein or otherwise suitably defined.

The method 200 is preferably implemented and/or executed using a system substantially analogous to the system 100; however, the method 200 can be implemented and/or executed by any other suitable system with any other suitable components that can be used for battery pack thermal management.

The battery thermal management system 100 and/or method 200 is preferably implemented in conjunction with an aircraft (e.g., the system can include an aircraft); in variations wherein the battery thermal management system is distributed between a vehicle and an infrastructure installation, the vehicle is preferably an aircraft. In particular, the aircraft is preferably a rotorcraft, but can additionally or alternatively include any suitable aircraft. The rotorcraft is preferably a tiltrotor aircraft with a plurality of aircraft propulsion systems (e.g., rotor assemblies, rotor systems, etc.), operable between a forward arrangement 105 (an example is shown in FIG. 19B) and a hover arrangement 106 (an example is shown in FIG. 19A). However, the rotorcraft can alternatively be a fixed wing aircraft with one or more rotor assemblies or propulsion systems, a helicopter with one or more rotor assemblies (e.g., wherein at least one rotor assembly or aircraft propulsion system is oriented substantially axially to provide horizontal thrust), and/or any other suitable rotorcraft or vehicle propelled by rotors. The rotorcraft preferably includes an all-electric powertrain (e.g., battery powered electric motors) to drive the one or more rotor assemblies, but can additionally or alternatively include a hybrid powertrain (e.g., a gas-electric hybrid including an internal-combustion generator), an internal-combustion powertrain (e.g., including a gas-turbine engine, a turboprop engine, etc.), and any other suitable powertrain.

The aircraft can have any suitable mass (e.g., unloaded mass, loaded mass, maximum takeoff mass, etc.) with any appropriate mass distribution (or weight distribution). The aircraft mass can be: 1 kg, 5 kg, 10 kg, 50 kg, 100 kg, 500 kg, 1000 kg, 1250 kg, 1500 kg, 1750 kg, 2000 kg, 2250 kg, 2500 kg, 2750 kg, 3000 kg, 5000 kg, 1000 kg, 20000 kg, less than 1500 kg, 1500-2000 kg, 2000-3000 kg, 3000-5000 kg, 5000-10000 kg, greater than 10000 kg, any suitable range bounded by the aforementioned values, and/or any other appropriate mass. The aircraft is preferably a passenger carrier, configured to transport 1, 2, 3, 4, 5, 6, 7, 10, greater than 10, and/or any suitable number of passengers, however the aircraft can alternately be an unmanned aircraft, a teleoperated passenger aircraft, and/or any other suitable aircraft.

In a specific example, portions of the battery thermal management are integrated into the electric tiltrotor aircraft described in U.S. application Ser. No. 16/409,653, filed 10 May 2019, which is incorporated in its entirety by this reference. However, any other suitable aircraft can be used.

Onboard portions of the battery thermal management system are preferably located in, mounted on, and transported with a vehicle 101. Onboard portions of the battery thermal management system are preferably integrated into an aircraft (e.g., the system can include an aircraft), but can additionally or alternatively be used with any other suitable vehicle (e.g., scooter, automobile, etc.).

In a specific example of the battery thermal management system, portions of the system are integrated into an electric tiltrotor aircraft including a plurality of tiltable rotor assemblies (e.g., six tiltable rotor assemblies). The electric tiltrotor aircraft can operate as a fixed wing aircraft, a rotary-wing aircraft, and in any liminal configuration between a fixed and rotary wing state (e.g., wherein one or more of the plurality of tiltable rotor assemblies is oriented in a partially rotated state). The control system of the electric tiltrotor aircraft in this example can function to command and control the plurality of tiltable rotor assemblies within and/or between the fixed wing arrangement and the rotary-wing arrangement.

The term "compressor" as utilized herein in relation to refrigeration systems, refrigeration cycles, sub-ambient cooling, or otherwise, is a mechanical device that increases the pressure of a gas (e.g., gas, vapor, liquid-vapor mixture, etc.) by reducing its volume. Compressors can be: positive displacement compressors, rotary compressors (e.g., lobe, screw, liquid ring, scroll, vane, etc.), reciprocating compressors (e.g., diaphragm, double acting, single acting, etc.), dynamic compressors (e.g., centrifugal, axial, mixed-flow, diagonal, air bubble, etc.), and/or any other suitable type of compressor. In examples, compressors can pressurize, compress, and/or transport compressible fluids, while pumps can pressurize and/or transport compressible and/or incompressible fluids (e.g., water, water/glycol mixture, oil, etc.).

The term "active cooling" as utilized herein, in relation to portions of the system 100, method 200, or otherwise, can refer to the application of electrical or mechanical energy, supplied from a battery pack or other power source, to remove heat from a thermal endpoint (e.g., as opposed to passive cooling that uses little or no energy). In particular, active cooling can refer to the use of forced convection heat transfer (e.g., as opposed to natural/free convection and/or radiation) between a system and/or component and a working fluid. Active cooling can include forced air through a fan or blower, forced liquid, and thermoelectric coolers (TECs), and/or other active cooling mechanisms.

The term "rotor" as utilized herein, in relation to portions of the system 100, method 200, or otherwise, can refer to a rotor, a propeller, and/or any other suitable rotary aerodynamic actuator. While a rotor can refer to a rotary aerodynamic actuator that makes use of an articulated or semi-rigid hub (e.g., wherein the connection of the blades to the hub can be articulated, flexible, rigid, and/or otherwise connected), and a propeller can refer to a rotary aerodynamic actuator that makes use of a rigid hub (e.g., wherein the connection of the blades to the hub can be articulated, flexible, rigid, and/or otherwise connected), no such distinction is explicit or implied when used herein, and the usage of "rotor" can refer to either configuration, and any other suitable configuration of articulated or rigid blades, and/or any other suitable configuration of blade connections to a central member or hub. Likewise, the usage of "propeller" can refer to either configuration, and any other suitable configuration of articulated or rigid blades, and/or any other suitable configuration of blade connections to a central member or hub. Accordingly, the tiltrotor aircraft can be referred to as a tilt-propeller aircraft, a tilt-prop aircraft, and/or otherwise suitably referred to or described.

The term "substantially" as utilized herein can mean: exactly, approximately, within a predetermined threshold (e.g., within 1%, within 5%, within 10%, etc.), predetermined tolerance, and/or have any other suitable meaning.

2. Benefits

Variations of the technology can afford several benefits and/or advantages.

First, variations of the technology can reduce the vehicle mass by arranging substantial portions of the thermal conditioning system at an extra-vehicular infrastructure installation 102. For an equivalent vehicle mass, this can also enable a higher overall energy capacity, and therefore increased range and/or power output (e.g., by replacing the portions of the thermal conditioning system that would otherwise be carried with the vehicle with additional battery pack mass). This can also enable more powerful heat exchangers to be used, since the heat exchanger weight is no longer limited by the vehicle's transportation capabilities. For example, a heat exchanger that can exchange a correspondingly greater amount of heat with the external environment than a vehicle-borne heat exchanger can be used to enable rapid (e.g., higher heat-generating) charging, and then left behind by the vehicle during operation (e.g., at the infrastructure installation). Reducing the size of onboard refrigeration components and/or eliminating refrigeration components from the vehicle can enable tighter packaging and/or volumetric constraints of the battery thermal management system, which can avoid thermal management components from infringing on cabin space. Additionally, eliminating onboard fans and/or compressors eliminates the acoustic impact of such devices, thereby reducing cabin noise, the reducing the total (external) acoustic profile of the vehicle, and/or improving passenger comfort. In variants, onboard refrigeration component removal can be enabled by rejecting the excess heat, generated by the battery cells (of the battery pack) during flight, into the battery pack thermal mass (e.g., other battery cells, the pack housing, pack electronics, etc.) to maintain the battery cell temperatures below the cell separation and/or degradation temperature.

Second, variations of the technology can leverage the vehicle environment and operation characteristics to condition the battery pack during operation without the need for active heating or sub-ambient cooling. For example, heat generated as the battery pack discharges during vehicle operation can be distributed within the battery pack (e.g., via active circulation to equalize the temperature across the thermal mass of the battery pack, via passive conduction among cells in the battery pack, etc.) to raise the battery pack temperature to a desired temperature set point (e.g., operation set point; via waste heat utilization to achieve uniformity within the battery pack). In another example, airflow around the vehicle can be used to convect heat away from the battery pack (e.g., via direct airflow adjacent to the battery pack, via airflow through a radiative cooler coupled to the onboard portion of the circulation subsystem or the battery pack itself, etc.) to lower the battery pack temperature to a desired temperature set point.

Third, variations of the technology can intelligently manage the thermal state of the battery pack during vehicle operation in accordance with dynamic mission objectives. For example, the technology can automatically respond to a change in mission objective from "proceed to destination" (e.g., nominal operation) to "emergency landing" by ceasing active circulation of the working fluid through the circulation subsystem to reserve battery pack energy for propulsion and control operations. In another example, the technology can automatically respond to a change in the flight profile (e.g., distance remaining until destination, time remaining until destination, electrical discharge or power requirements of the remaining flight profile, etc.) by adjusting the flow rate of the circulating working fluid to redistribute the heat within the battery pack among the thermal mass of the pack in accordance with a new desired temperature distribution (e.g., determined dynamically based on the new flight profile).

Fourth, variations of the technology can enhance the safety characteristics of the vehicle by preventing, predicting, detecting, and/or mitigating thermal events in the battery pack of the vehicle. Active circulation of working fluid through can redistribute heat within the battery pack to minimize temperature variation among battery cells within the same or a different battery pack (an example is shown in FIG. 11B), reducing the likelihood of thermal runaway within a battery cell. Additionally, battery cells transferring heat via a circulating working fluid reduces the need for conductive heat transfer between cells of a battery pack (e.g., as a means to equalize temperature), allowing the cells to be thermally insulated from one another, thereby reducing the likelihood that thermal runaway will propagate to other cells within the same pack. For example, by circulating working fluid within the battery pack during discharge (e.g., vehicle operation), the technology can prevent a thermal event (e.g., by preventing any one portion of the battery pack from exceeding a nominal temperature, by promoting temperature uniformity within the battery pack, etc.). In another example, the technology can predict a thermal event (e.g., based on temperature data from temperature sensors coupled to the battery pack and/or circulation subsystem) and proactively adjust (e.g., increase) the flow rate of the circulating working fluid (e.g., by way of the onboard pump) to prevent occurrence or worsening (e.g., runaway) of the thermal event. In another example, the technology can automatically divert power to thermal event mitigation (e.g., by operating the onboard pump at the highest achievable flow rate) in response to detection of a successful emergency landing or stoppage (e.g., wherein propulsion systems are no longer required) to enable the vehicle to be safely exited (e.g., by passengers and/or crew) or the vehicle's surroundings to be safely vacated (e.g., by bystanders). However, such variations can otherwise suitably enhance the safety characteristics of the vehicle by way of battery thermal management.

Fifth, variations of the technology can leverage the defined duration and other characteristics of trips in certain vehicle types (e.g., aircraft) to predict energy expenditures (e.g., and associated heat generation) with high accuracy, and correspondingly improve battery thermal management. For example, an aircraft with a defined and known onboard energy capacity (e.g., stored in one or more battery packs) has an operational envelope associated with its performance characteristics (e.g., aerodynamic behaviors, speed, propulsion power, drag, mass, etc.) that does not dynamically change for a given trip (e.g., flight), because the performance characteristics can be precisely known and the external factors are known to higher certainty than in other contexts (e.g., the weather parameters can be precisely measured, but the route and/or destination does not dynamically change such as in automobile contexts). Thus, such variations can factor in a correspondingly greater number of precisely known a priori data to the predicted temperature profile of the battery pack during the trip, and condition the battery pack accordingly before the trip commences (e.g., without needing to travel with a dynamic battery conditioning system in the event that the trip parameters change substantially). In a specific example, a battery takeoff temperature setpoint is determined based on an estimated battery pack heat generation during the trip (e.g., flight) and the thermal mass of the battery pack and/or circulation subsystem, thereby ensuring that the battery pack does not exceed thermal and/or performance limitations during the trip.

However, variations of the system can additionally or alternatively provide any other suitable benefits and/or advantages.

3. System

The battery thermal management system 100 includes a battery pack 110, a circulation subsystem 120, and a heat exchange system 130. The circulation subsystem includes: a pump 122 and a fluid manifold 124, and can optionally include a hose coupling 126 and a lockout mechanism 128. The system 100 can optionally include a cooling system 190, a reservoir 150, a de-ionization filter 160, a battery charger 170, and a controller 180. The system 100 can additionally or alternatively include any other suitable components. An example of the system 100 is shown in FIG. 1.

The battery pack functions to store energy for powering vehicle operations during use. The battery pack can also function to release the stored energy (e.g., in the course of powering vehicle operations). The energy stored by the battery pack is preferably stored in the form of chemical potential energy and released in the form of electrical energy; however, the energy can additionally or alternatively be stored and/or released in any suitable form. Operation of the battery pack can include charging of the battery pack, discharging of the battery pack, and/or maintenance of the charge of the battery pack (e.g., storage of energy); however, operation of the battery pack can include any other suitable use of the battery pack.

The battery pack is integrated with the vehicle 101, and can be arranged within, upon, or otherwise suitably coupled to the vehicle. Thus, the battery pack moves (e.g., is transported) with the vehicle as the vehicle moves. The system can include any suitable number of battery packs. The system can include: one battery pack per propulsion system, one battery pack associated with a plurality of propulsion systems, one propulsion system associated with a plurality of battery packs, a plurality of battery packs onboard the vehicle (e.g., 2, 3, 4, more than 4, etc.), a single battery pack for the vehicle, and/or any other suitable number of battery packs associated with any number of aircraft components. The battery packs can have any suitable arrangement, and can be located in the fuselage, empennage, wing, cabin (e.g., below a passenger region), tail, a nacelle, and/or any other suitable region. Preferably, the batteries are symmetrically distributed about the center of the aircraft, but can additionally or alternately be offset by a predetermined distance from a passenger region, (e.g., by 1 meter, 2 meters, >2 meters, etc.), another battery, a rotor disk, a rotor disk plane, and/or any other suitable vehicle component, and/or otherwise distributed about the vehicle. For example, the system can include one battery pack for each propulsion unit (or other suitable load) that powers an associated electric motor. In another example, the system can include a single battery pack connected to each propulsion unit (e.g., an automotive vehicle with a single battery pack and a single integrated powertrain including multiple motors). In further examples, the system can include a number of battery packs greater than the number of propulsion units; a number of battery packs less than the number of propulsion units; and/or any suitable number of battery packs. The battery packs can be interconnected in any suitable manner with the powered components of the vehicle (e.g., wherein a plurality of battery packs is connected to each powered component for redundancy in a fault-tolerant power network).

The battery pack can include a plurality of cells in any suitable arrangement (e.g., parallel, serial, etc.) that cooperatively make up the battery pack.

The battery pack and the cells thereof can use various battery chemistries to store electrochemical energy in a rechargeable manner. For example, the battery pack be an aluminum ion battery, a carbon battery (e.g., a single carbon battery, a dual carbon battery, etc.), a flow battery (e.g., a vanadium redox battery, a zinc-bromine battery, a zinc-cerium battery, etc.), a lead-acid battery (e.g., a deep cycle battery, a VRLA battery, an AGM battery, a gel battery, etc.), a glass battery, a lithium-ion battery (e.g., a lithium ion lithium cobalt oxide battery, a lithium ion manganese oxide battery, a lithium ion polymer battery, a lithium iron phosphate battery, a lithium-sulfur battery, a lithium-titanate battery, a thin film lithium ion battery, a lithium ceramic battery, etc.), a magnesium ion battery, a metal-air electrochemical battery (e.g., a lithium-air battery, an aluminum-air battery, a germanium-air battery, a calcium-air battery, an iron-air battery, a potassium-ion battery, a silicon-air battery, a zinc-air battery, a tin-air battery, a sodium-air battery, a beryllium-air battery, etc.), a molten salt battery, a nickel-cadmium battery (e.g., a vented cell nickel-cadmium battery), a nickel hydrogen. battery, a nickel-iron battery, a nickel metal hydride (NiMH) battery, a nickel-zinc battery, an organic radical battery, a polymer-based battery, a polysulfide bromide battery, a potassium-ion battery, a rechargeable alkaline battery, a rechargeable fuel battery, a sand battery, a silicon air battery, a silver-zinc battery, a silver calcium battery, a sodium-ion battery, a sodium-sulfur battery, a solid-state battery, a ferrate salt cathode battery (e.g., a super-iron battery), a zinc-ion battery, and/or any other suitable battery utilizing any other suitable chemistry for the storage and release of electrical energy. Additionally or alternatively, the battery pack can include capacitive energy storage units such as capacitors, supercapacitors, and/or any other suitable means for storing electrical energy and releasing the electrical energy in a controllable manner.

The battery pack can include any suitable energy storage capacity which can be <10 kWh, 10 kWh, 25 kWh, 35 kWh, 50 kWh, 80 kWh, 100 kWh, 150 kWh, >150 kWh, any suitable range defined by the aforementioned values, and/or any other suitable storage capacity. Preferably, the charge rate of the battery pack (and/or individual cells within the battery pack) is limited to 2 C, but can alternately be <1, 1 C, 1.5 C, 2.5 C, 3 C, 5 C, >5 C, and/or any other suitable charge rate.

The battery cells can have any suitable electrical and/or power characteristics. The battery cells can operate at any suitable voltage (e.g., 2.4V, 4.2V, nominal, max, minimum, etc.), charge current, discharge current, C-rate, energy capacity, temperature range, and/or have any other suitable characteristics. In a specific example, each battery cell in the battery pack is arranged in series. In a second specific example, two sets of battery cells (in series) in a battery pack are arranged in parallel. The battery cells in a battery pack cooperatively generate a pack voltage, which can be: <100V, 240V, 350V, 400V, 450V, 600V, >600V, any range bounded by the aforementioned values, and/or any other suitable pack voltage.

Figure 9A:
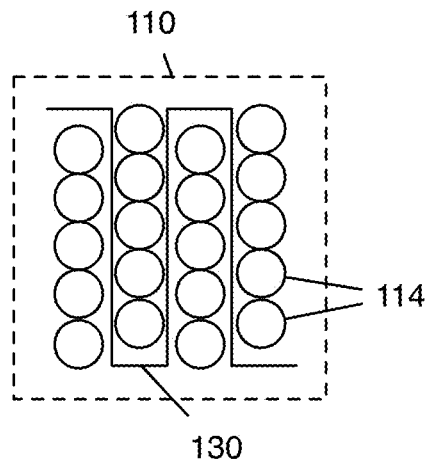
FIGS. 9A, 9B, and 9C depict a first, second, and third example arrangement of battery cells and an onboard heat exchanger, respectively.
Figure 9B:
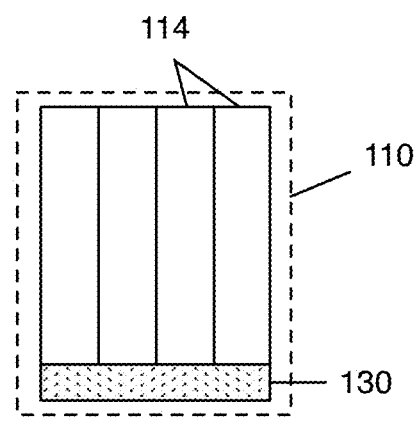
Figure 9C:
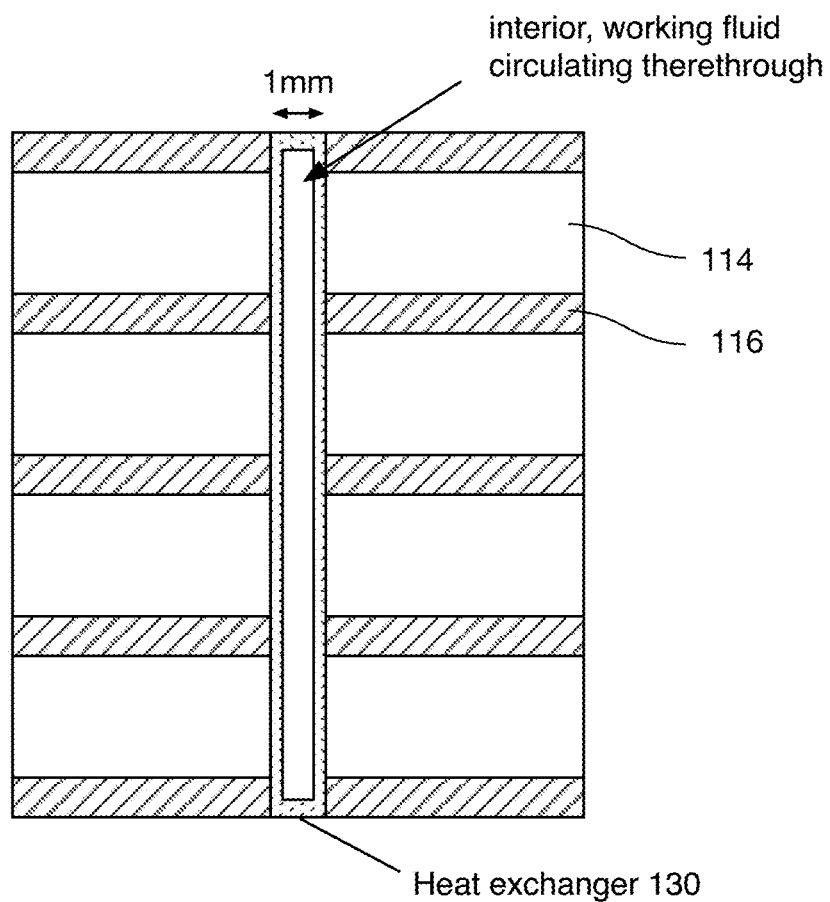

The battery cells inside the battery pack can have any suitable geometry and/or arrangement. The battery cells can be cylindrical, button, prismatic, pouch, and/or any other suitable geometry. The battery cells are preferably arranged into multiple cell arrays, but can be arranged in a single array or otherwise arranged. The battery pack can include thermal insulation 116 between cells in the same array (e.g., interleaved between cells), adjacent cell arrays (e.g., interleaved between arrays), and/or any other suitable cell set. The thermal insulation 116 can be made of any suitable material, such as polyurethane, cellulose, fiberglass, carbon fiber, polystyrene, metal, plastic, and/or any other suitable insulation material. An example of a battery pack configuration including thermal insulation is illustrated in FIG. 9C. In a specific example, cell arrays can include 12 cells, 24 cells, 28 cells, 32 cells, 36 cells and/or any other suitable number of cells per pack and/or onboard heat exchanger.

The circulation subsystem preferably thermally interfaces with the top, bottom, and/or side (cylindrical, arcuate, broad, and/or narrow faces) of the battery cells. The circulation subsystem preferably thermally interfaces with the battery cells via the onboard heat exchanger, but can alternately interface with the battery cells through any other suitable component. The thermal interface can be arranged on the side of the cell array opposing the thermal insulation, adjacent the thermal insulation, on the bottom with thermal insulation on the side, on the side with thermal insulation on the bottom, interdigitated between cell arrays, interdigitated between cells, and/or otherwise arranged relative to the cell and/or thermal insulation.

The circulation subsystem of the battery thermal management system functions to increase temperature uniformity (e.g., among cells) within the battery pack. Increasing temperature uniformity can include reducing temperature disparity between disparate regions (e.g., cells) of the battery pack. In cases wherein the battery pack is at or near a uniform temperature, the circulation subsystem can also function to uniformly or nearly-uniformly adjust the temperature of the battery pack (e.g., to condition the battery pack temperature). The circulation subsystem can also function to circulate working fluid through and/or adjacent to the battery pack. The circulation subsystem can also function to store heat generated by the battery pack. The circulation subsystem can include the fluid envelope within which the working fluid is circulated, an onboard pump, a reservoir, a heat exchanger (e.g., onboard and/or offboard) and an offboard pump.

The fluid envelope functions to house the working fluid as it circulates among components of the battery thermal management system. The envelope can include piping, tanks, valves, regulators, and/or any other suitable fluid handling components. For example, the envelope can include the fluid manifolds (e.g., distribution manifolds) and the cold plate volumes. The envelope can be made of any suitable material that can transfer heat between the working fluid and other components of the system (e.g., the heat exchanger, the battery pack, etc.) and/or the external environment (e.g., the airflow proximal the battery pack). The envelope can be thermally uninsulated, partially insulated (e.g., along a portion of the periphery), or insulated from the environment/ambient conditions. The envelope can be constructed of any suitable materials such as: metals, plastics, polymers, rigid materials, non-rigid materials, or any suitable combination thereof. The material of the envelope is preferably selected to correspond to the properties/requirements of the working fluid (e.g., to avoid corrosion or other deleterious interactions, avoid degradation in high and/or low temperature conditions, meet pressure requirements of circulation subsystem, minimize head loss in circulation subsystem, etc.), but can additionally or alternatively be selected with any suitable basis.

The circulation subsystem preferably includes an onboard pump, which functions to circulate working fluid through the battery pack (e.g., via the onboard heat exchanger, via a cold plate). The system preferably includes at least one onboard pump for each battery pack; accordingly, a plurality of battery packs is preferably associated with a corresponding plurality of onboard pumps. However, the system can include one pump for each set of two battery packs, and/or any other suitable number of onboard pumps. The onboard pump is preferably arranged within the vehicle, and connected to the envelope in parallel to an interface connection between the vehicle and the infrastructure installation as shown in FIG. 2. More preferably, the onboard pump is arranged proximal to one or more battery packs (examples are shown in FIGS. 5A-B, 6A-B, and 7A-B), which can reduce the required mass/volume of working fluid and/or fluid manifold components required to fluidly connect the pump to the battery pack(s). The onboard pump can be integrated into a battery pack, separate from a battery pack, integrated into a reservoir, proximal to the hose coupling, and/or otherwise implemented. The onboard pump is preferably arranged between the battery packs it services (e.g., physically between; at an intermediate position along the fluid coolant circuit), but can alternatively be arranged to the side of the battery packs, in a separate vehicle component, or at any other suitable location.

The onboard pump can also function to circulate working fluid through the battery pack at a defined flow rate, wherein the defined flow rate is determined by an onboard pump controller. The onboard pump is preferably sized (e.g., physically sized, sized according to maximum pumping speed and power requirements, etc.) according to the volume of working fluid onboard the vehicle when the circulation subsystem is disconnected from the infrastructure installation (e.g., a smaller volume). For example, the onboard pump can be smaller, lighter, and/or less powerful than the offboard pump because the onboard pump is preferably not used to circulate the working fluid during conditioning (e.g., when the circulation subsystem is connected to the infrastructure installation and thus the heat exchanger). However, the onboard pump can additionally or alternatively be otherwise suitably sized.

Figure 11A:
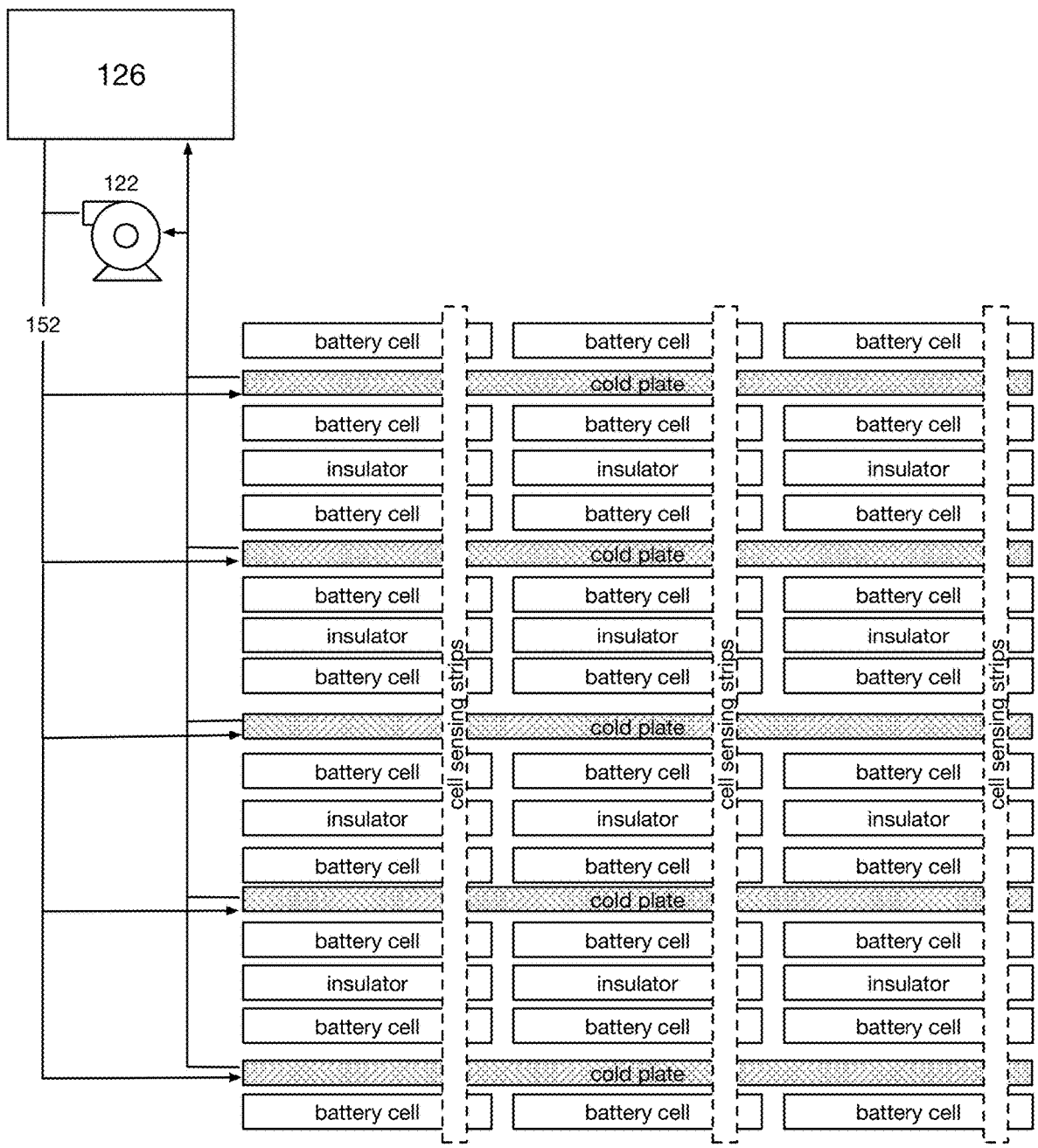
FIG. 11A depicts an example arrangement of battery cells within a battery pack.
Figure 11B:
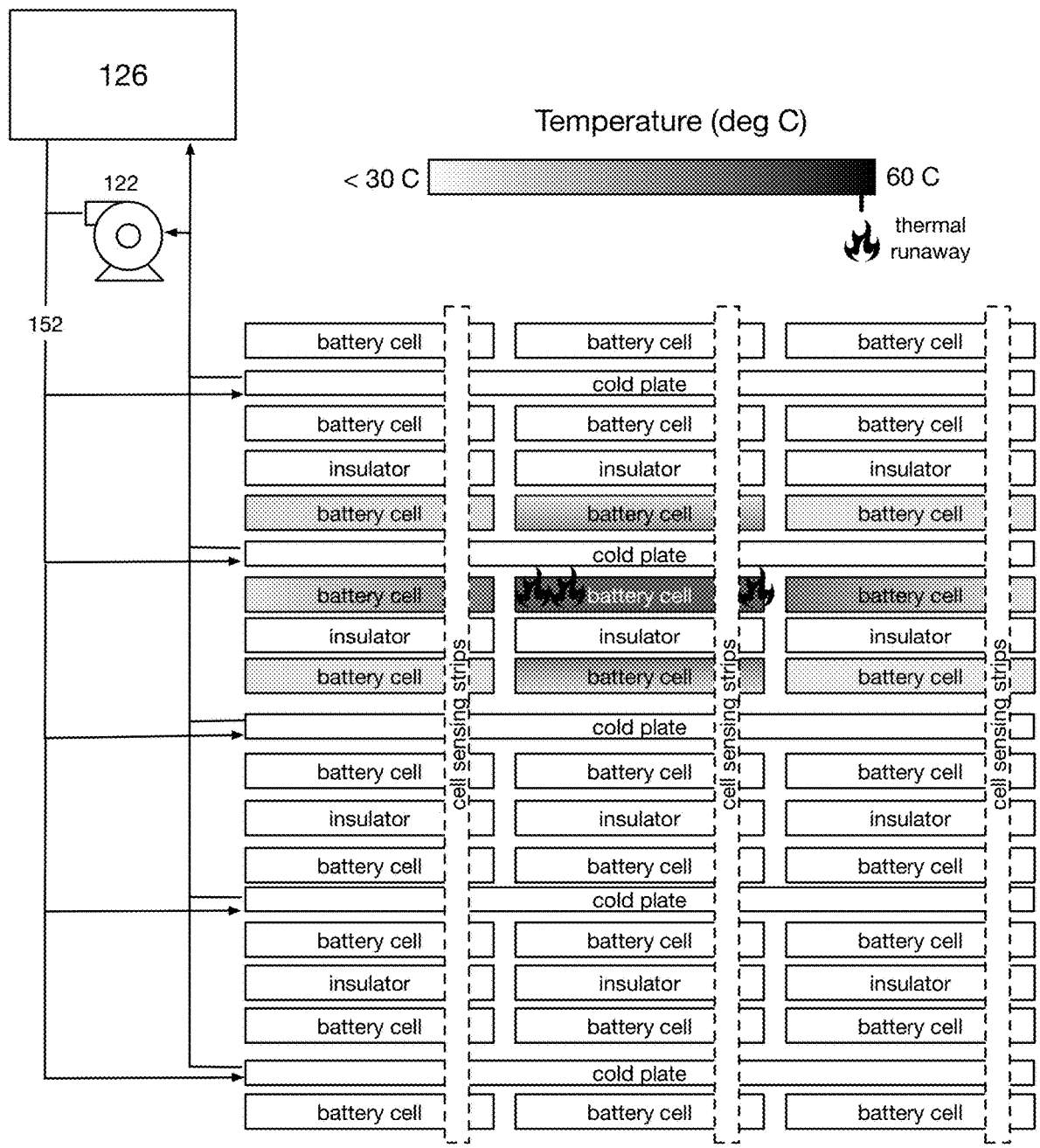
FIG. 11B depicts thermal propagation in a thermal event in an example battery pack architecture.

The onboard pump is preferably connected to the envelope in parallel (examples are shown in FIG. 2 and FIG. 11A), such that the onboard pump can be held idle during conditioning by the combined battery thermal management system (e.g., wherein the vehicle is connected to the infrastructure installation including the heat exchanger). In examples, the onboard pump defines a pumping speed range that is matched to the volume of working fluid onboard the vehicle when the vehicle is detached from the infrastructure installation, and in cases wherein the vehicle is attached to the infrastructure installation for conditioning the onboard pump is not used, in favor of an offboard pump (e.g., sized or otherwise configured for the greater pumping requirements of the combined system and working fluid volume). In a first variant, the onboard pump is fluidly connected to two battery packs and is located between them (e.g., coplanar with the battery packs, arranged within the projection of the battery pack sides, etc.), thereby minimizing the length of tubing required. In a second variant, the onboard pump is located in a wing (e.g., two pumps—one located in each wing), which can ensure the fluid manifold does not infringe on cabin space. However, the onboard pump can be otherwise arranged.

In alternative variations, the onboard pump can be a passive (e.g., unpowered) pump that is driven by temperature differentials originating from waste heat (e.g., generated by the battery pack during discharge, one or more electric motors during operation, etc.). The circulation subsystem can be arranged to create such temperature differentials in order to establish a convective loop of the working fluid through the envelope; for example, the envelope can be arranged within the vehicle to reject heat to the environment at a first position, and guide working fluid (e.g., gravitationally) around a closed, thermally driven cycle. However, the onboard pump can be otherwise suitably configured to passively circulate the working fluid in such variations.

The onboard pump can be any appropriate type of pump, such as: submerged pump, unsubmerged pump, positive displacement pump (e.g., rotary, reciprocating, linear), impulse pump, velocity pump, centrifugal pump, axial-flow pump, gear pump, screw pump, progressive cavity pump, roots pump, peristaltic pump, plunger pump, triplex-type plunger pump, radial-flow pump, valveless pump, helico-axial pump, and/or any other suitable type of pump. The onboard pump can have any suitable maximum flow rate, which can be limited based on the: supply power, physical limitations of the circulation subsystem, electronic control, and/or otherwise defined. The maximum flow rate of the onboard pump can be: <5 L/min, 5 L/min, 10 L/min, 20 L/min, 40 L/min, 60 L/min, 80 L/min, 100 L/min, >100 L/min, any range defined by the aforementioned values, and/or any other suitable flow rate. The onboard pump can accept any suitable supply power. The input supply can be AC or DC, with any suitable supply voltage such as: 12 VDC, 24 VDC, 48 VDC, 96 VDC, 120 VAC, 240 VAC, the same voltage as the battery pack, and/or any other suitable supply voltage. The onboard pump supply power can have any suitable maximum continuous or peak power, such as: <25 W, 25 W, 50 W, 100 W, 250 W, 350 W, 500 W, 1 kW, 2.5 kW, 5 kW, 10 kW, >10 kW, any suitable range defined by the aforementioned values, and/or any other suitable power.

The pump controller functions to operate the pump (e.g., onboard pump) between various modes, including a failsafe mode. In the failsafe mode, the pump can operate at a high flow rate in response to the detection of an off-nominal state (e.g., a thermal event) in order to circulate working fluid through the battery pack and thereby mitigate an existing thermal event and/or prevent propagation of a thermal event across multiple cells in the battery pack. Entering the failsafe mode can be triggered by detection of a thermal event in one or more cells of the battery pack, loss of power to a redundant portion of the onboard pump controller (e.g., one of two control modules), detection of a precursor condition to a thermal event, loss of communication, and/or any other suitable trigger event. The pump controller can regulate pump PRM, flow rate, pressure (e.g., pump head), power state (e.g., on/off) and/or any other suitable pump parameter.

The pump controller can be integrated into the battery electronics, integrated into the pump, or separate from the pump and battery electronics. The pump controller can be located proximal to the pump, proximal to the battery pack, proximal to a vehicle controller (e.g., flight computer), between battery pack and pump, between two battery packs, and/or otherwise arranged.

The pump controller is preferably fault tolerant, such that the onboard pump is able to operate effectively even in cases wherein all or part of the battery pack has failed (e.g., due to a thermal event, due to other trauma to the system, etc.) and ceased delivering electrical power. Fault tolerance can be achieved by powering the onboard pump controller and onboard pump using redundant connectivity between the onboard pump controller and onboard pump and a single battery pack; fault tolerance can additionally or alternatively be achieved using redundant connectivity to the onboard pump controller and onboard pump from multiple battery packs.

Figure 3A:
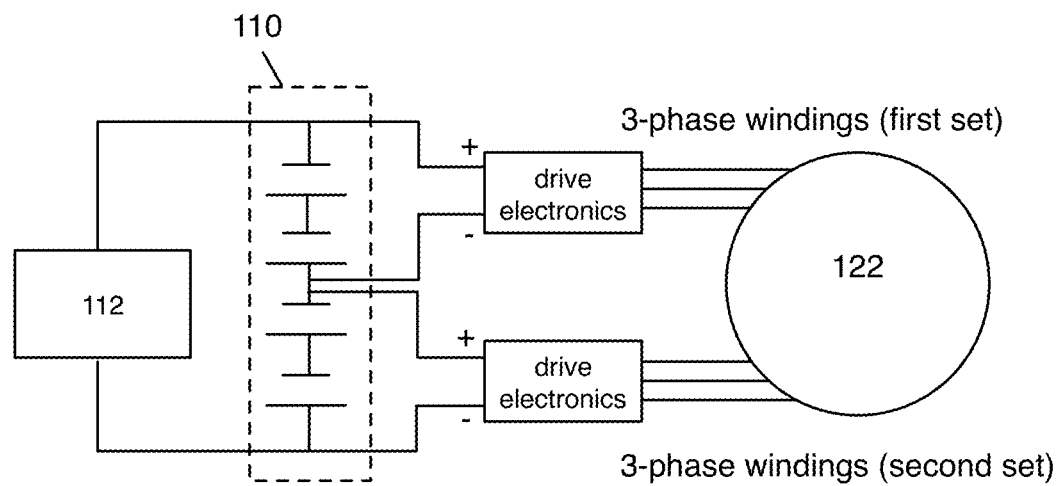
FIGS. 3A and 3B depict a first and second example electrical connectivity configuration of an onboard pump connected to a first and second battery pack, respectively.
Figure 3B:
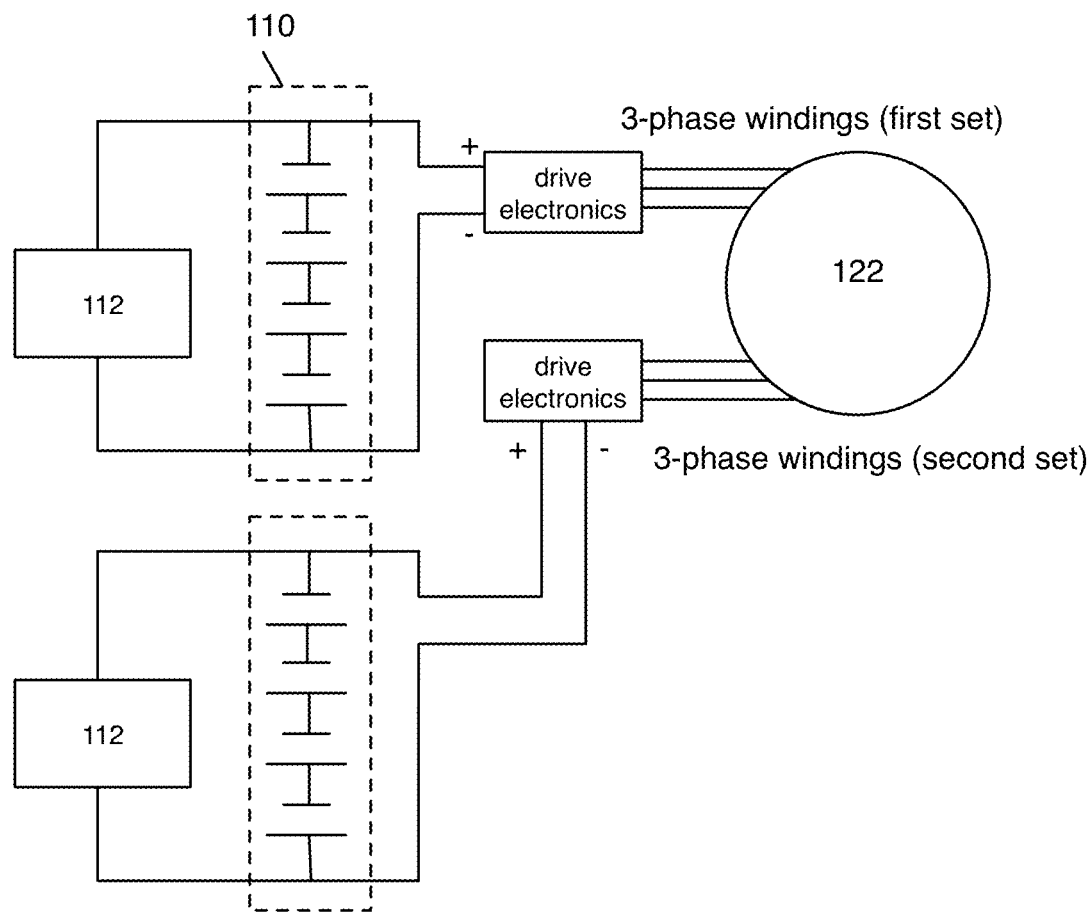

In a specific example of a fault tolerant configuration, the onboard pump is powered by two different halves of the battery pack via parallel sets of three phase windings, as shown in FIG. 3A (e.g., each electrically isolated subset of the same battery pack powers a different phase-set of the pump). In a second specific example of a fault tolerant configuration, the onboard pump is powered by a first battery pack and a second battery pack via distinct sets of three phase windings, an example of which is shown in FIG. 3B.

In fault tolerant configurations, the failsafe mode of operation of the onboard pump can include operating the pump on one set of three phase windings if a thermal event occurs in one of the cells of the battery pack associated with the other of the two sets of three phase windings. The pump can enter the failsafe mode (e.g., high flow rate) in response to various trigger events as described above, including the loss of power to one of the parallel motor drive electronics subsystems (e.g., due to a thermal event disrupting power delivery to one of the parallel motor drive electronics subsystems), the receipt of a failure trigger from the battery electronics (e.g., generated in response to a detected power surge or droop associated with a possible thermal event), and/or any other suitable trigger event.

Figure 10A:
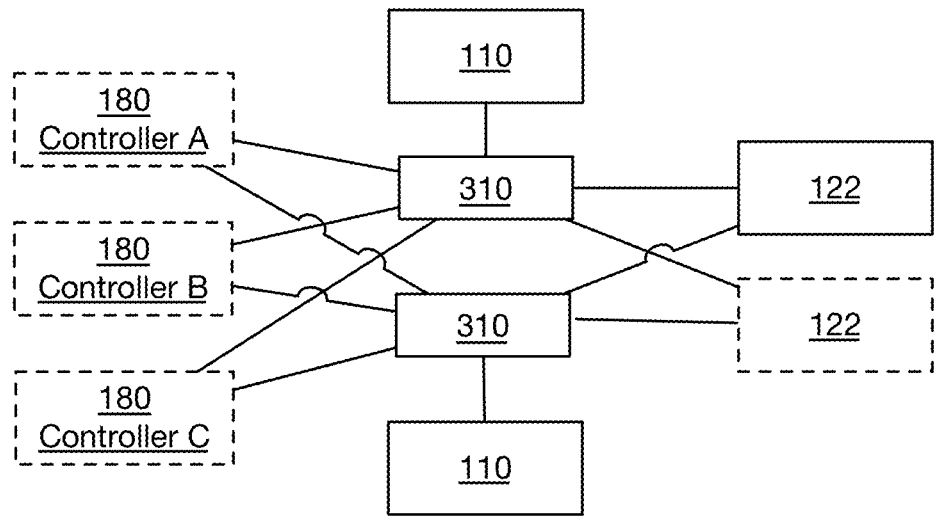
FIGS. 10A, 10B, and 10C depict a first, second, and third example of a fault tolerant pump architecture, respectively.
Figure 10B:
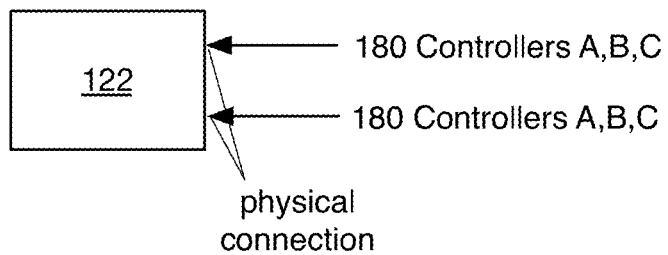
Figure 10C:
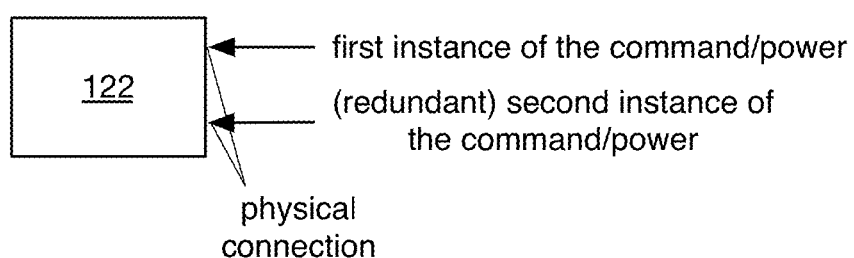

In a variant of a fault tolerant configuration, the pump controller is redundantly powered by the architecture described in U.S. application Ser. No. 16/573,837, filed 17 Sep. 2019, which is incorporated in its entirety by this reference. In a specific example of the variant, the pump controller is redundantly powered and/or communicatively connected to a first switch set and a second switch set. Each switch set 310 receives control data from a plurality of flight controllers. The first switch set is connected to a first battery pack and the second switch set is connected to a second battery pack. Examples are illustrated in FIGS. 10A-10C.

Fault tolerant configurations can include fault tolerant data and/or power connections to/from any suitable vehicle components. Vehicle components can include one or more: mission displays, radios, controllers, data loggers or acquisition devices, vehicle navigation systems (VNS), one or more cabin systems (e.g., powered devices within the cabin of the aircraft, powered devices that control environmental parameters of the cabin of the aircraft, etc.), avionics gateways, air data booms, battery management systems (BMS), heating, ventilation, and air-conditioning (HVAC) components, inceptors, inverters (e.g., a quad inverter, a standard inverter, etc.), flight devices (e.g., that control surfaces, such as ailerons, flaps, rudder fins, landing gear, etc.), vehicle sensors (e.g., kinematics sensors, such as IMUs; optical sensors, such as cameras; acoustic sensors, such as microphones and radar; temperature sensors; smoke detectors; fire rope sensors; altimeters; pressure sensors; and/or any other suitable sensor), and any other suitable components onboard the vehicle. Vehicle components can additionally or alternately include: a sensor fusion module, a flight path vector module, data acquisition cards, a data acquisition logger, and an Ethernet radio module.

Figure 13A:
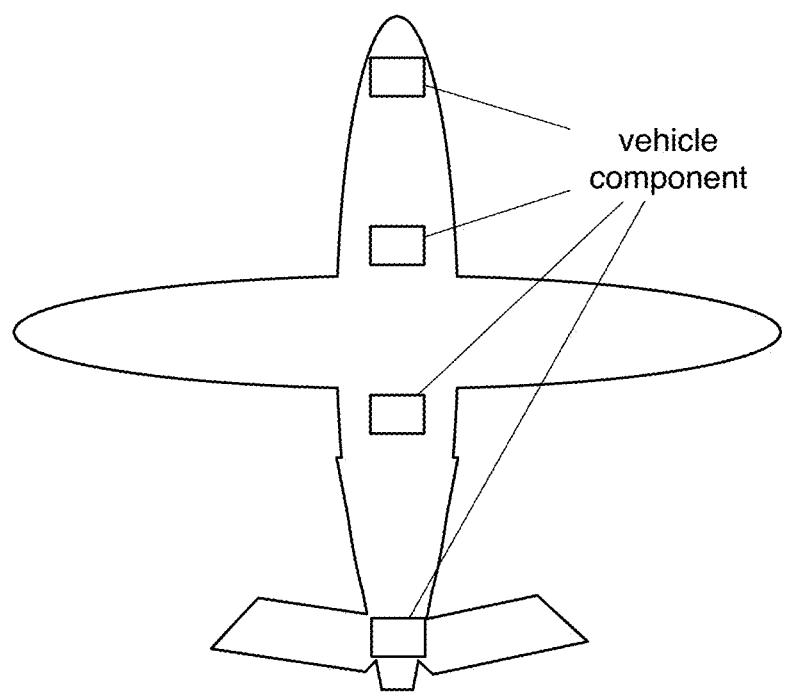
FIG. 13A is a top view representation of vehicle components distributed about an aircraft.
Figure 13B:
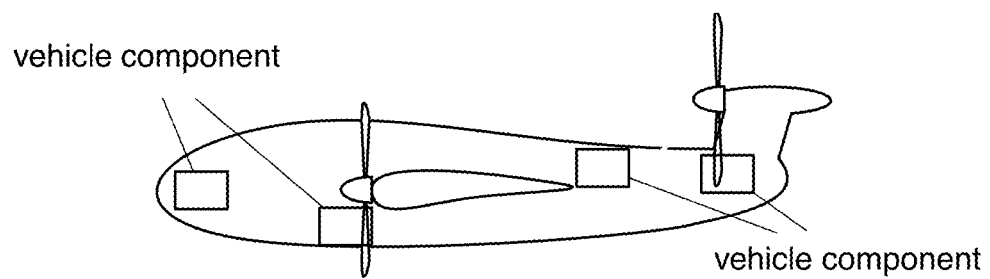
FIG. 13B is a side view representation of vehicle components distributed about an aircraft.
Figure 13C:
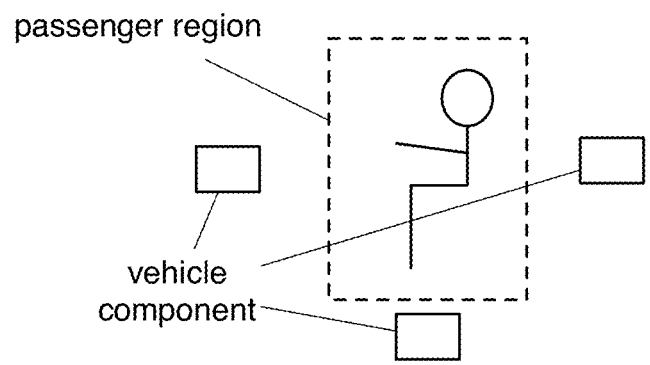
FIG. 13C is a side view representation of vehicle components distributed about passenger region of an aircraft.
Figure 13D:
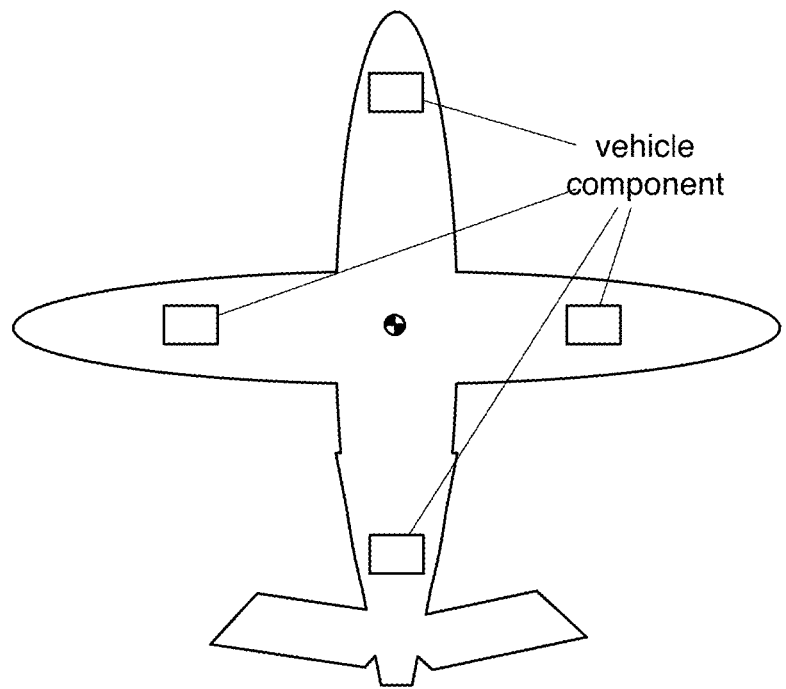
FIG. 13D is a top view representation of vehicle components distributed about an aircraft.

Redundant vehicle components can be distributed with any appropriate geometry or relationship. Redundant vehicle components can be distributed: linearly (e.g., parallel with or aligned along the pitch or roll axes as shown in FIG. 13A, additionally or alternately skewed or otherwise oriented, etc.); arranged in a single plane (e.g., above or below cabin, spanning the wing, along a plane defined by yaw and roll axes, or any arbitrary plane); distributed a predetermined distance away from vehicle components (e.g., offset by >1 m; offset by 2 m; offset by 5 m; a distance between 0.5 m-30 m; or any appropriate distance from: passengers, rotors, fuel tanks, batteries, landing gear, etc.); and/or distributed or collocated relative to switches, switch sets, or flight components (e.g., within 1 meter, 1-3 meters, adjacent to, within the same housing or electrical enclosure of: a switch, instance of a component such as a motor or motor inverter, group of flight components, a cluster of non-critical flight systems, the center of mass as shown in FIG. 13D, the center of pressure, etc.). The controllers are preferably spaced apart by a minimum distance, wherein the minimum distance (e.g. 1 meter, 50 cm, >1 meter, any appropriate minimum distance) is determined based on an electrical are path for the vehicle or conductive pathway (e.g., minimum distance from conductive pathway, opposite sides of conductive pathway, spaced apart by a distance relative to the distance of a flight computer to the conductive pathway, etc.), or impact survivability (e.g., determined by crash test, modelling or historic data relating to: fires and fire shielding, explosive components, decompression, lightning, charge neutralization, bird strike, user impacts, other sources of damage, etc.) such as in areas unlikely to be affected by same/similar source of damage (e.g., in front of cockpit, below passengers, behind luggage, rear of vehicle), and can additionally or alternately can be based on spatial constraints, user safety (as shown in FIG. 13C), accessibility, wiring length (e.g., determined relative to standard cable and/or wire lengths, etc.), or otherwise arranged. Additionally or alternatively, the flight computers can be arranged arbitrarily in 3 dimensions in any appropriate manner. In a first example illustrated in FIG. 13B, there is one controller located in front of the cockpit, one below the passengers, one behind the luggage compartment, and one in the tail (or empennage) of the vehicle. In a second example, there is at least one controller on opposite sides of a conducting pathway (or common ground).

The circulation subsystem can include an offboard pump, which functions to circulate working fluid 152 through the heat exchanger and battery pack to condition the battery pack. The offboard pump can additionally or alternately function to circulate working fluid through the fluid manifold while fluidly connected to the circulation subsystem. The offboard pump can additionally or alternatively function to circulate the working fluid through the offboard heat exchanger to condition the working fluid. The offboard pump is preferably a component of an infrastructure installation 102 that is offboard the vehicle and connected to by the vehicle during conditioning; however, the offboard pump can additionally or alternatively be a standalone component of the battery thermal management system. The offboard pump can operate independently of the onboard pump, in conjunction with the onboard pump (e.g., increasing the pressure and/or flow rate of working fluid), and/or otherwise operate. The offboard pump can be the same or different from the onboard pump—it can be the same/different type, same/different size, same/different power, and/or otherwise implemented. The offboard pump can be powered by a battery charger, external power source, battery packs, and/or be otherwise powered. The offboard pump can be arranged in series or parallel with the onboard pump(s), and/or there can be a plurality of offboard pumps arranged in series/parallel.

In some variations, the system can include both onboard and offboard pumps; in alternative variations, the system can include just an onboard pump (e.g., wherein the onboard pump can circulate working fluid through the battery pack in isolation as well as the battery pack and heat exchanger in combination when the vehicle is coupled to the infrastructure installation, and wherein the onboard pump is appropriately sized for circulating working fluid through both the isolated and combined circulation subsystem), or just an offboard pump (e.g., wherein the working fluid can passively circulate, such as via convection driven by waste heat from the battery pack, in situations wherein the vehicle is not coupled to the infrastructure installation).

In variants, the offboard pump can be the same size as the onboard pump and/or configured to circulate the working fluid at substantially the same flow rate as the onboard pump (e.g., circulating working fluid within: 50%, 25%, 15%, 10%, 5%, 2%, 1%, and/or exactly equivalent flow rate). Alternatively, the offboard pump can circulate working fluid at a greater flow rate than the onboard pump, can be larger than the onboard pump, can be smaller than the onboard pump, and/or can be otherwise configured.

In a first variant, the onboard and offboard pumps circulate the same working fluid. In a second variant, the onboard and offboard pump circulate different working fluids. In a first example of the second variant, the offboard pump injects the working fluid into the onboard system, wherein the onboard working fluid is drained before offboard cooling, then re-introduced before flight. In a second example of the second variant, the offboard pump circulates a second working fluid parallel to the onboard system (e.g., wherein the onboard working fluid is thermally connected but fluidly isolated from the offboard working fluid). In a third variant, there is no offboard pump.

The circulation subsystem can optionally include one or more fluid manifolds (or distribution manifolds) which functions to contain the working fluid and fluidly connect a remainder of components of the fluid envelope. The fluid manifold can fluidly connect and/or terminate at the onboard pump, onboard heat exchanger, fluid coupling, reservoir, and/or any other suitable components, connected in any combination of series and/or parallel. Preferably, the fluid manifold connects: an outlet of the onboard pump to an inlet of the onboard heat exchanger, an outlet of the onboard heat exchanger to an inlet of the pump, an inlet of the onboard heat exchanger to an outlet of the infrastructure installation (and/or an inlet of the fluid coupling), an outlet of the onboard heat exchanger to an inlet of the infrastructure installation (and/or an outlet of the fluid coupling), and/or connects any of the aforementioned connections to a reservoir. The fluid manifold can include piping, tanks, valves, regulators, and/or any other suitable fluid handling components. The fluid manifold can be thermally uninsulated, partially insulated (e.g., along a portion of the periphery), or insulated from the environment/ambient conditions. The fluid manifold can be constructed of any suitable materials such as: metals, plastics, polymers, rigid materials, non-rigid materials, or any suitable combination thereof. The material of the of the fluid manifold is preferably selected to correspond to the properties/requirements of the working fluid (e.g., to avoid corrosion or other deleterious interactions, avoid degradation in high and/or low temperature conditions, meet pressure requirements of circulation subsystem, minimize head loss in circulation subsystem, etc.), but can additionally or alternatively be selected with any suitable basis.

Figure 5A:
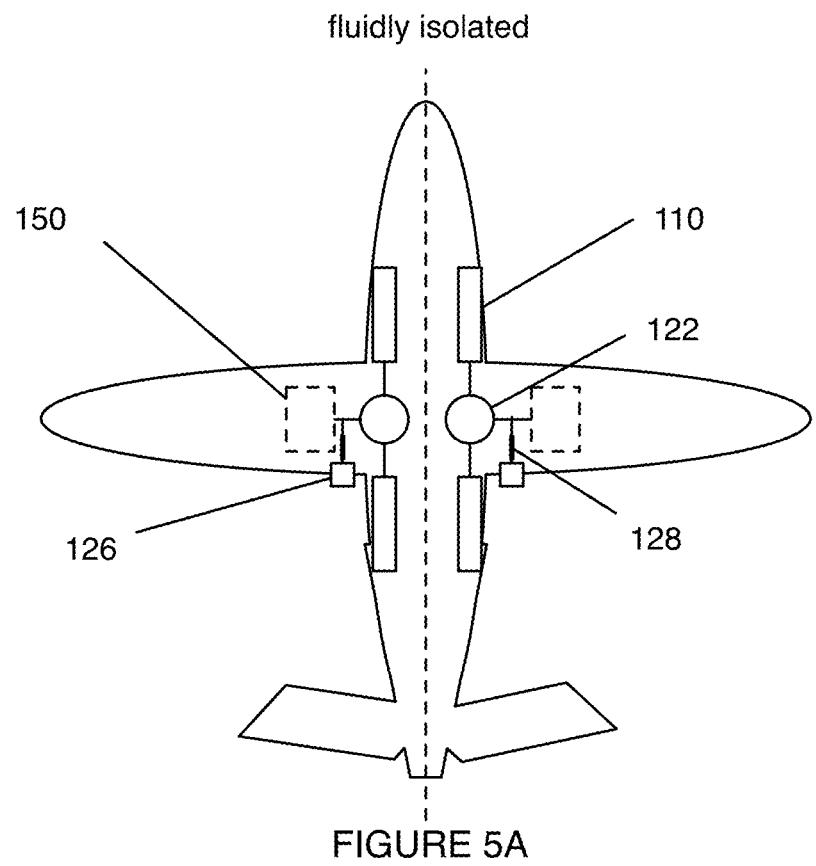
FIGS. 5A and 5B depict example arrangements of onboard elements the battery thermal management system, respectively.
Figure 5B:
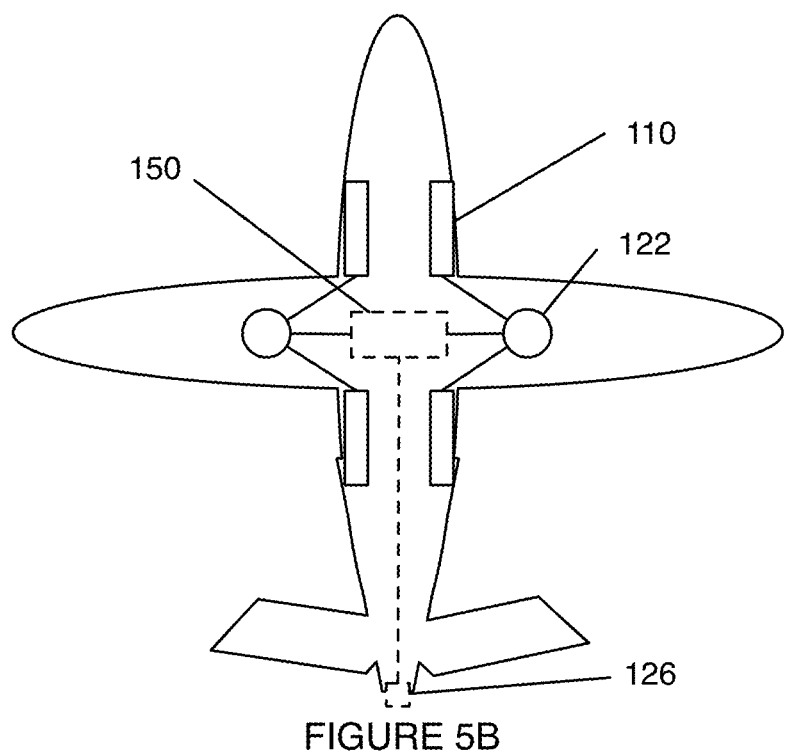
Figure 6A:
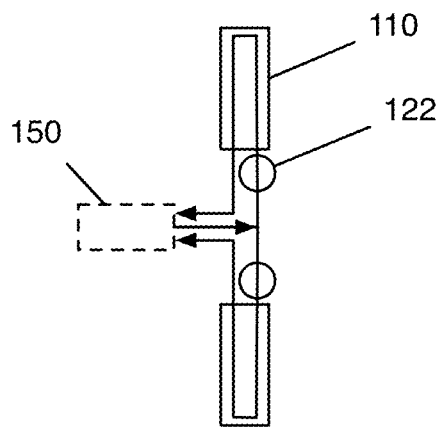
FIGS. 6A and 6B depict example arrangements of fluid connections and power connections of a battery thermal management system variant, respectively.
Figure 6B:
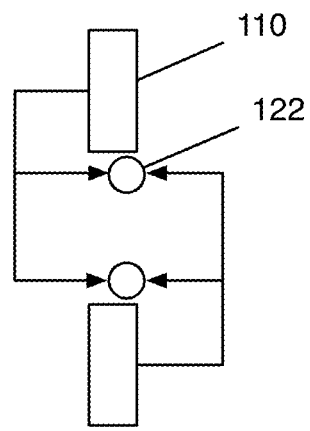
Figure 7A:
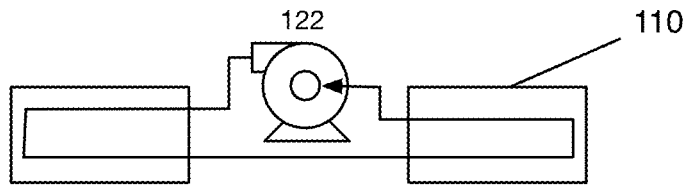
FIGS. 7A and 7B depict example arrangements of fluid connections and power connections of a second battery thermal management system variant, respectively.
Figure 7B:
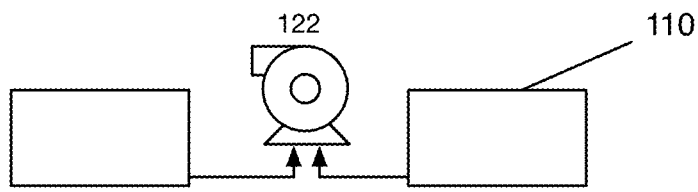

The circulation subsystem can optionally include a reservoir (examples are shown in FIG. 5A and FIG. 5B), which functions to hold working fluid in variations wherein the heat management is a closed system and working fluid is not exchanged with the environment (e.g., wherein the working fluid is not air). The reservoir is preferably a component of the infrastructure installation (e.g., ground-based portion) of the system, but in some variations the system can include an onboard reservoir instead of or in addition to a ground-based reservoir. The reservoir can be constructed of any suitable metal, such as plastic, composite and/or any other suitable material. Material choices for the reservoir can enable various advantages. Materials (e.g., aluminum, metals, etc.) can be selected to enable passive heat dissipation through the vehicle frame/body to the ambient environment. Materials can be selected to enable arbitrary arrangement of the reservoir—plastics (e.g., blow molded, injection molded) can provide a highly degree of geometric variance at low cost, while composites can minimize weight and/or serve as structural elements of the vehicle.

Additionally, the reservoir can function as a heat reservoir (adding thermal mass to the system). The volume (and/or associated mass of working fluid), for a thermal reservoir can be selected based on a range tradeoff between thermal capacity (e.g., for the specific heat of the working fluid contained within the reservoir) and the added mass of the fluid. In variants, the pump can selectively increase/decrease the mass of working fluid contained within the reservoir before beginning a trip based on the temperature setpoint and/or other trip parameters before takeoff, ensuring the optimal efficiency and/or range for different trips.

The circulation subsystem can optionally include a hose coupling, which functions to fluidly connect the working fluid onboard the vehicle to the extravehicular infrastructure (e.g., offboard cooling system). Preferably, the hose coupling establishes a dry connection (minimal leakage from connecting/disconnecting), but can alternately establish a wet connection and/or any other suitable fluid connection. The fluid coupling can be: threaded or unthreaded, gendered or ungendered, tapered or untapered, can optionally include a gasket, can optionally an include a spring-loaded valve (e.g., dry connection), and/or can have any other suitable features. The hose coupling can include a: camlock, quick-connect, quick disconnect, flanged coupling, hoselink, express coupling, storz, tri-clamp connection, leverlock, and/or any other suitable hose coupling type. The hose coupling can be any suitable material such as brass, stainless steel, aluminum, plastic, and/or any other material with any appropriate material finish (e.g., corrosion resistance, etc.). The hose coupling can include a vehicle side (integrated with the vehicle, connected to the circulation subsystem) and an extravehicular side (e.g., mechanically connected to the infrastructure installation 102). In a first variant, the extravehicular side of the hose coupling can be integrated with a charging connector 172 (e.g., part of a charging handle, as shown in the example in FIG. 18). In a first example, the fluid connection and electrical connections are established simultaneously. In a second example, the fluid connection can engage/disengage separately from the electrical connection. In a second variant, the vehicle side of the hose coupling is separate from electrical connector. In a third variant, the system includes a set of inflow and a set of outflow hose couplings, enabling round-trip circulation of the working fluid through the circulation subsystem. The battery thermal management system can include any suitable number of hose couplings: such as one, two, three, four, more than four per: aircraft, pump, battery pack, reservoir, charging station, electrical connector, charger, and/or suitable number of hose couplings.

The circulation subsystem can optionally include a lockout mechanism (e.g., interlock) which functions to fluidly disconnect the extravehicular infrastructure from the vehicle (e.g., onboard circulation subsystem). The lockout mechanism can be an electrical interlock, mechanical interlock, fluid interlock, shutoff valve, and/or any other suitable mechanism. The lockout mechanism can operate manually or automatically by any suitable actuation mechanism. The actuation can be electromechanical (e.g., solenoid valve, biased open, biased closed, etc.), manual (e.g., user operated), mechanical (e.g., spring loaded, relying on fluid pressure/flow to generate state change from open to closed, etc.), and/or otherwise operate. Preferably the lockout mechanism automatically decouples the fluid line if a decoupling condition is satisfied, such as if: the flow rate exceeds an absolute threshold, the flow rate differs from the flow rate commanded (e.g., by the BMS, pump controller, controller, etc.), the temperature of the incoming fluid exceeds an absolute threshold, the temperature of the incoming fluid differs from the expected temperature by a predetermined amt (e.g., >5 deg C.), composition of offboard working fluid does not match that of the working fluid onboard the vehicle (e.g., 50/50 water glycol onboard vs 80/20 offboard), the system receives a user input (e.g., hit a button, audio input, etc.) to activate the lockout mechanism, and/or any other suitable decoupling condition is satisfied. The lockout mechanism can be arranged at any suitable location relative to the aircraft and/or circulation subsystem. Preferably the lockout mechanism is arranged proximal to and/or integrated with the hose coupling, but can alternately be arrange at each onboard heat exchanger, proximal the onboard pump inlet, and/or have any other suitable arrangement. In a specific example, the lockout mechanism is a solenoid valve integrated with the hose coupling (an example is shown in FIG. 5A), and is configured to decouple the hose coupling in response to the decoupling condition being satisfied.

The circulation subsystem can optionally include a deionization filter, which functions to remove ions from the working fluid which can be introduced during battery cooling, conditioning, and/or otherwise introduced. The ion filter is preferably located offboard the vehicle (e.g., in the extravehicular infrastructure) to reduce vehicle mass/complexity, as continuous ion filtration is not required in some variants, however the deionization filter can alternately be located onboard the vehicle in any appropriate portion of the circulation subsystem. The working fluid can pass through the deionization filter: continuously, during battery charging, periodically, during battery conditioning (e.g., while fluidly connected to extravehicular infrastructure), and/or with any other suitable timing. In variants, the ion filter can reduce the conductivity of the coolant, which can reduce the likelihood of shorting in the event of a leak.

The heat exchange system 130 functions to distribute, transfer, remove (e.g., reject), and/or otherwise manage heat. The heat exchange system can exchange heat between a heat source and a heat sink. The heat source is preferably the heat generating components of the system (e.g., battery cells, battery pack, control electronics, etc.), but can be any other suitable heat source. The heat sink can be: the working fluid, another battery pack component (e.g., battery pack housing, battery cell, etc.), another battery pack, an aircraft component (e.g., support structure, etc.), the cabin (e.g., cabin environment, volume of air in the cabin), the ambient environment, and/or any other suitable heat sink.

The heat exchange system 130 is preferably thermally and fluidly connected to the circulation subsystem, but can be only thermally connected to the circulation subsystem, thermally or fluidly isolated from the circulation subsystem, or otherwise connected to the circulation subsystem. The heat exchange system 130 is preferably thermally connected to the battery pack (and/or cells therein), but can additionally or alternatively be fluidly connected to the battery pack or otherwise connected to the battery pack. The heat exchange system 130 can include one or more onboard heat exchangers for each cell, cell array, cell array pair, battery pack, or other cell subpopulation. The cells within a cell array can be thermally connected to a heat exchanger in series, in parallel, or a combination thereof. An onboard heat exchanger can be thermally connected to one or more cell arrays. The cell arrays within the battery pack can be thermally connected to a heat exchanger in series (e.g., by a single fluid path), in parallel, or any suitable combination thereof.

The heat exchange system can include one or more heat exchangers, manifolds, and/or other components. Examples of heat exchangers and/or heat exchange components can include: a condenser, an evaporators, a radiator, a cold plate (or cooling plate), hot plate (or heating plate), a double pipe heat exchanger, a shell and tube heat exchanger, a plate heat exchanger, a plate and shell heat exchanger, an adiabatic wheel heat exchanger, a plate fin heat exchanger, a pillow plate heat exchanger, a waste heat recovery unit, a phase-change heat exchanger, a direct contact heat exchanger (e.g., gas-liquid, immiscible liquid—liquid, solid-liquid or solid—gas, etc.), a microchannel heat exchanger, air coils, a helical-coil heat exchanger, a spiral heat exchanger, and/or any other suitable type or arrangement of heat exchanger. and/or any other suitable heat exchange component.

The heat exchange system 130 can include one or more: onboard heat exchangers arranged onboard the aircraft, offboard heat exchangers arranged offboard the aircraft, and/or other heat exchangers.

The onboard heat exchanger preferably functions to distribute heat across the battery packs and/or battery cells of the battery pack. The onboard heat exchanger can alternately function to: heat the battery cells, cool the battery cells, increase the thermal mass of the battery pack, remove heat from the battery cells for temporary thermal storage in the working fluid (e.g., during a trip, thereby increasing the thermal capacity of the system, etc.), function as a heat interface between the cells and the working fluid, increase the structural rigidity of the battery pack (e.g., function as a structural member or as part of the housing), and/or perform other functionalities. Alternately, the onboard heat exchanger can function to transfer thermal energy to an onboard cooling system (e.g., radiator, active cooling system, etc.). In one example, the onboard heat exchanger removes (e.g., rejects) less than a threshold amount or proportion of battery-generated heat from the aircraft during flight (e.g., removes less than 90%, 80%, 70%, 60%, 50%, 40%, 30%, 20%, 10%, 5%, etc. offboard the aircraft during flight). In a second example, the onboard heat exchanger passively removes battery-generated heat from the aircraft (e.g., using a radiator, using an aircraft component as a radiator, etc.). In a third example, the onboard heat exchanger actively removes battery-generated heat from the aircraft.

The heat exchange system 130 can include a single onboard heat exchanger per battery pack, multiple onboard heat exchangers per battery pack (e.g., one per cell array, one per cell), and/or any other suitable number of onboard heat exchangers per battery pack, cell array, or battery cell. Multiple onboard heat exchangers can be: stacked (e.g., with the cell, with the cell array), arranged adjacent each other (e.g., in-plane), interleaved, and/or otherwise arranged.

The onboard heat exchanger can interface the with the battery cells by side cooling, bottom cooling, and/or flood cooling (e.g., with a non-conductive working fluid, with mineral oil working fluid). The onboard heat exchanger preferably includes a plurality of cooling channels (e.g., in series and/or parallel), which can have any suitable thickness. Preferably, the heat exchanger channel thickness is minimized in order to improve packaging and/or thermal efficiency: the thickness can be: <0.5 mm, 0.5 mm, 1 mm, 1.5 mm, 2 mm, 3 mm, 4 mm, 5 mm, 7 mm, 10 mm, >10 mm, any range bounded by the aforementioned values, and/or any other suitable thickness. The onboard heat exchanger can be constructed of any suitable materials, which can be rigid, flexible, metal (e.g., copper, steel, aluminum, titanium, high temp plastics, etc.), thermal interface material (e.g., thermal paste), and/or any other suitable materials. The onboard heat exchanger can have any suitable construction.

Examples of the onboard heat exchanger include: a cold plate (e.g., cooling plate) type heat exchanger, which transfers heat from the battery cell to a working fluid within the cold plate's cavity; a solid thermally conductive plate; a flexible heat exchanger; heat pipes, heat spreaders, heat pipes, fins, extended surfaces, and/or another heat exchanger. In a first specific variant (an example of which is illustrated in FIG. 9A), cylindrical battery cells can be side cooled by a non-rigid heat exchanger. In a second specific variant, (an example of which is illustrated in FIG. 9B), battery cells are bottom cooled by a heat exchanger.

The onboard heat exchanger can have any suitable relationship or arrangement relative to: a cell, a cell array subset, an array of cells, a battery pack, and/or any other suitable component. For example, the onboard heat exchanger can thermally contact all or a portion of: a narrow face of the cell (e.g., cell side), broad face of the cell, edge of the cell, and/or any other suitable portion of the cell or cell array. Preferably, the onboard heat exchanger allows circulation of the working fluid therethrough, removing heat from the battery cell(s) by conduction. Alternately, the onboard heat exchanger can exchange (e.g., remove) heat with the battery by forced convection, free convection, or radiation as the primary mode of heat transfer. The onboard heat exchanger is preferably permanently integrated with the battery pack, but can alternatively be removably integrated with the battery pack (e.g., to increase or decrease the envelope and/or battery pack thermal mass).

The thermal interface between the battery pack (battery cells of the battery pack) and the onboard heat exchanger can be configured to redistribute thermal energy between battery cells, redistribute thermal energy between battery cells of the same array, redistribute thermal energy between arrays of battery cells within the same battery pack, redistribute thermal energy between battery packs, cool the battery pack (or battery cell), heat the battery pack (or battery cell), and/or transfer thermal energy from the battery pack (or battery cell) to the circulation subsystem, but can be otherwise configured. In a specific example, the circulation subsystem includes an onboard heat exchanger located inside the battery pack, thermally connecting the battery pack to the working fluid. In the first specific example, the onboard heat exchanger is a cold plate, which can function in multiple ways, such as: heating the battery cells, redistributing heat between the battery cells, cooling the battery cells, transferring heat from the battery cells for temporary thermal storage in the working fluid (e.g., during a trip, thereby increasing the thermal capacity of the system, etc.), and/or performing other functionalities. In a specific variant, the thermal interface between the battery pack and the onboard heat exchanger can be an adhesive, bonding agent, thermal interface material (TIM), and/or other component. In a specific example, the onboard heat exchanger is a cold plate glued to the bottom of the cells, ensuring thermal contact (e.g., with no or minimal air gap) and increasing the structural rigidity (i.e., cold plate can act as a structural element and/or transfer loads to the carbon structure/vehicle frame).

The offboard heat exchanger of the heat exchange system 130 preferably functions to exchange heat between the working fluid and the external environment, remove heat from the aircraft (e.g., offboard the aircraft), remove heat from the circulation system, and/or otherwise manage heat. In a first variant, the heat exchanger directly exchanges heat from the working fluid to the surrounding air (e.g., by forced convection). In a second variant, the offboard heat exchanger indirectly exchanges heat to the external environment by thermally connecting the working fluid to a sub-ambient cooling system (e.g., refrigeration cycle). The offboard heat exchanger can cool the working fluid and/or heat the working fluid, depending upon the desired temperature set point of the battery pack. Because the offboard heat exchanger is preferably a component of the infrastructure installation, the type and configuration of heat exchanger is preferably not constrained by the available space and/or mass budget associated with the vehicle.

The offboard heat exchanger is preferably part of the infrastructure installation, and is preferably not integrated with the vehicle. The offboard heat exchanger is preferably an active heat exchanger (e.g., wherein the working fluid is actively flowed through a structure to increase the heat transfer from the working fluid to the external environment such as air, wherein the external fluid such as air is actively flowed to increase heat transfer to or from the working fluid, etc.), but can additionally or alternatively be a passive heat exchanger (e.g., a heat sink) that transfers the heat to or from the working fluid to an external fluid medium (e.g., the air). The offboard heat exchanger can include: a condenser, an evaporator, a radiator, a refrigeration system, a cooling system, and/or any other suitable component.

In a first variant, a refrigeration system can be arranged in an extra-vehicular (off-board) infrastructure installation, allowing the vehicle to operate without the mass of one or more components of the refrigeration system. A refrigeration system can include one or more refrigeration components such as a: compressor, heat exchanger (intercooler, conditioner, evaporator, etc.), fan, air duct, thermal expansion valve (TXV), drier, refrigerant (e.g., a reservoir or volume of fluid), refrigerant manifold, and/or any other suitable elements. Including one or more refrigeration components in an extra-vehicular installation can reduce (e.g., the required power, size, volume, and/or cost of the component onboard the vehicle) and/or eliminating the need for such components to be included among the components on-board the aircraft. In a specific example of the first variant, the vehicle includes a small on-board compressor and a larger off-board compressor. In a second specific example of the first variant, the vehicle does not include an onboard compressor thermally connected to the circulation subsystem.

In a second variant, the heat exchange system 130 can include a cooling system 190, which functions to remove thermal energy from the working fluid thereby conditioning the battery. Preferably, the cooling system is located offboard the aircraft (e.g., separate and distinct from the aircraft; e.g., be the offboard heat exchanger or component thereof) as a part of the extravehicular infrastructure, however the cooling system can alternately be located onboard the aircraft (e.g., a small cooling system onboard the aircraft and a larger cooling system offboard the aircraft), and/or be otherwise located. The cooling system is preferably a subambient cooling system which cools via the refrigeration cycle, and can include any suitable refrigeration components such as: compressor 192, offboard heat exchanger (intercooler, condenser, evaporator, etc.), fan, air duct, thermal expansion valve 194 (TXV), drier, refrigerant (e.g., a reservoir or volume of fluid), refrigerant manifold, and/or any other suitable elements. Including one or more cooling components in an extra-vehicular installation can reduce (e.g., the required power, size, volume, and/or cost of the component onboard the vehicle) and/or eliminating the need for such components to be included among the components on-board the aircraft. In a specific example, the system includes a small on-board compressor and a larger off-board compressor. In a second specific example of the first variant, the vehicle does not include an onboard compressor thermally connected to the circulation subsystem. In a third example, a large volume of working fluid is cooled in an offboard cooling system advance of the battery conditioning (e.g., before the aircraft lands). In the third example, the battery thermal management is not limited to the maximum cooling power or heat rejection, of the refrigeration cycle, but rather relies on the thermal capacity of the reservoir to condition the battery pack, which can enable more efficient cooling (e.g., via a larger temperature difference between the working fluid and the battery cells). In a fourth example, the working fluid on the vehicle is replaced with chilled working fluid from the offboard cooling system, thereby increasing the thermal capacity of the onboard reservoir. However, the offboard cooling system can alternately include a super-ambient cooling system and/or any other suitable cooling system with any other suitable cooling components.

The system can include battery electronics 112, such as a battery management system (BMS). The battery electronics can be coupled to one or more battery packs (e.g., with a 1:1, 1:N, or N:1 battery electronics to battery pack relationship). The battery electronics function to monitor the state of the battery pack. The state of the battery pack can include: state of charge (SoC), state of health (SoH), state of power (SoP), state of safety (SoS), temperature (e.g., of the pack, of a cell, of a cell array, of the working fluid, a temperature distribution of cells, etc.), and/or any other suitable characteristics. The battery electronics can also function to report the state of the battery pack to other components of the battery thermal management system. The battery electronics can also function to control the charge and/or discharge of the battery pack (e.g., based on commands from a vehicle operator or computerized vehicle operation system). The battery electronics can additionally function to control recirculation and/or cooling systems onboard or offboard the vehicle.

The battery electronics can include one or more sensors. The sensors of the battery electronics function to measure parameters of the battery pack during operation. The sensors can measure the electrically-related parameters of the battery pack (e.g., current flow through the battery pack, voltage of the battery pack, charge state of the battery pack, etc.), thermal parameters of the battery pack (e.g., temperature at any suitable point in the battery pack, temperature outside the battery pack, temperature change rate at any suitable point in or around the battery pack, etc.), flow rate of the working fluid through the battery pack (e.g., through the heat sink), and/or any other suitable parameters. Any suitable sensor type or modality can be utilized to measure the aforementioned parameters (e.g., a current probe, a shunt, a thermocouple, a thermistor, etc.). The battery electronics can include a communication module (wired or wireless) configured to communicatively connect to the on-board pump, vehicle controller, extravehicular infrastructure (e.g., off-board pump, battery charger, off-board cooling system, etc.), and/or any other suitable vehicle component/ endpoint.

The battery electronics can be cooled by the same system(s) as the battery cells 114 and/or different cooling components. The battery electronics can be air cooled, connected to separate heat sink, thermally connected to airframe, and/or otherwise cooled separately from the battery cells—thereby reducing the thermal load on the battery thermal management system. The battery electronics can be powered by the battery packs that it controls, and/or be powered by a separate battery pack.

The battery thermal management system can optionally include a charging station, which functions to supply electrical energy to the battery packs. The charging station can be integrated with the offboard cooling system or can be separate. The electrical connector (a.k.a. charger) and hose coupling can be integrated into a single device (e.g., a charging handle) or can be separate devices. There can be any suitable number of charging stations such as one or more per: aircraft, battery pack, pump, hose coupling, or there can be multiple aircrafts, battery packs, pumps, and/or hose couplings associated with a single charging station. In a first variant, the system includes a single charger (e.g., with +/− sides) and a single (offboard side) hose coupling (e.g., with separate inlet and outlet tubes), which can connect to: the rear of the vehicle, front of the vehicle, side of the vehicle, wing of the vehicle, and/or other suitable endpoint. In a second variant, the system includes two (offboard side) hose couplings (e.g., with separate inlet and outlet tubes), which can connect to: the front/rear of the vehicle, left/right sides of the vehicle, left/right wings of the vehicle, and/or other suitable vehicle endpoints.

The battery thermal management system can optionally include an authorization mechanism which functions to ensure that authorized cooling and/or charging systems can charge/cool the vehicle. In a first variant, the authorization system is mechanical. In a first example of the first variant, a proprietary key unlocks the fluid coupling. In a second example of the first variant, the fluid coupling has a proprietary interface. In a second variant, the authorization system is digital. In a first example of the second variant, the offboard fluid coupling head or offboard charging and/or cooling installation sends its identifier to controller (e.g., onboard controller), the controller verifies the offboard charging/cooling system (e.g., with an onboard database, with a central management system, with a proprietary cloud system, etc.), and the controller initiates cooling/charging in response to verification (e.g., by starting the pump, unlocking the fluid coupling, etc.). In a second example, the offboard charging and/or cooling system verifies the aircraft in the same or similar manner to the first example.

In a specific example, the battery thermal management system includes a set of onboard and offboard components. The set of onboard components of this example includes one or more battery packs, a portion of the circulation subsystem, an onboard pump, and an onboard pump controller, and excludes a heat exchanger or reservoir. The set of onboard components are integrated with an eVTOL aircraft in this example. The set of offboard components of this example (e.g., the infrastructure installation) includes a heat exchanger, another portion of the circulation subsystem that can be connected to the onboard portion to enable conditioning of the one or more battery packs, an offboard pump, an offboard pump controller, and a reservoir. In a specific example, the vehicle excludes heavy components (e.g., components weighing more than 5%, 10%, 20%, etc. of the unloaded vehicle weight) of the circulation subsystem or thermal conditioning system, such as a compressor or refrigeration unit.

The system can include a controller. The controller can be distributed across multiple nodes (e.g., a computational node aboard the vehicle and a node coupled to the infrastructure installation) or centralized at a single point (e.g., a centralized controller that is communicatively coupled with controllable components of the system such as the onboard pump controller, the offboard pump controller, etc.). The controller functions to execute command instructions based on input data to control elements of the battery thermal management system. In examples, the controller can execute or implement the entirety or portions of the method 200; however, the controller can additionally or alternatively execute or implement any suitable functionality of the system components as described herein or otherwise suitably defined.

The system can optionally include gas relief (e.g., venting) to evacuate pressurized or unpressurized working fluid in a gaseous state (or other gasses) from any suitable portion of the fluid manifold and/or fluid envelope. Working fluid vaporization can, in variants, protect against propagation of thermal events and/or increase the thermal capacity of the system by taking advantage of the latent heat of vaporization of the working fluid. Gas relief mechanisms (vents, valves, burst membranes, etc.) can be included in: the battery pack (e.g., pack side, pack end), onboard heat sink, fluid manifold (e.g., adjacent to the pump), reservoir, the pump, and/or at any other suitable location in the fluid envelope. In variants, thermal events (e.g., thermal runaway) can be mitigated by making more working fluid (e.g., coolant) available to change phases (e.g., vaporize and capture latent heat of vaporization), which can allow greater heat absorption without requiring heat redistribution to other parts of the system (e.g., internal energy of gas rejected through gas relief mechanisms does not remain in system). In a first example, the flow rate can increase (e.g., pump RPM, redirect coolant toward one or more cells undergoing a thermal event, redirect coolant toward anticipated thermal event, pumping more coolant from the reservoir, etc.) to enable increased availability of fluid for phase change. In a second example, heat absorbed through phase change (e.g., vaporization) is removed/rejected from the system. In a third specific example, heat absorbed through phase change (e.g., vaporization) remains in the system, and can be redistributed to working fluid (e.g., in a reservoir, in a liquid phase), other battery cells, and/or other suitable endpoints. However, thermal events can be otherwise mitigated using the working fluid or other mechanism.

The system of the preferred embodiment and variations thereof can be embodied and/or implemented at least in part as a machine configured to receive a computer-readable medium storing computer-readable instructions. The instructions are preferably executed by computer-executable components preferably integrated with and/or part of the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

4. Method

As shown in FIG. 4, the method 200 includes: determining the temperature setpoint of the battery pack S100; and adjusting the battery pack temperature to the temperature setpoint S150. The method can additionally or alternatively include determining the temperature of the battery pack S200; and redistributing heat within the battery pack based on the temperature of the battery pack S250. The method 200 can additionally or alternatively include any other suitable processes.

Block S100 includes determining the temperature setpoint of the battery pack. Block S100 functions to determine a target temperature to which the battery pack should be conditioned. Block S100 is preferably performed prior to vehicle departure from the infrastructure installation, such that the active conditioning components of the infrastructure installation can be used to condition the battery pack (e.g., in accordance with one or more variations of Block S150), but Block S100 can additionally or alternatively be performed at any other suitable time. Block S100 is preferably performed automatically by a controller substantially analogous to the controller of the system 100, but can be otherwise suitably performed by any suitable component of a suitable system and/or entity associated with such a system (e.g., a human operator).

The temperature setpoint is preferably the takeoff temperature setpoint, but can additionally or alternatively be the operational setpoint or any other suitable setpoint.

Block S100 is preferably performed based on the trip profile of the vehicle. The trip profile can include a duration, trip range, vehicle weight, time spent in various modes of operation (e.g., hover, forward/cruise, transition, takeoff, landing, etc.), ambient temperature (e.g., of locations along the trip), battery parameters (e.g., age, capacity, cell type/model, current temperature, current SoC, SoP, SoH, etc.), vehicle weight, cargo weight, weight distribution, and/or any other suitable parameters. Battery parameters can be determined for an individual cell, can be generic for cells with similar parameters, can be determined for a battery pack, can be generic for battery packs with similar parameters, or be otherwise determined. In examples wherein the vehicle is an aircraft, the trip profile can include a flight plan (e.g., for one or more flights or legs of a flight) and/or any other flight data (e.g., weather data, air traffic data, etc.). The trip profile can be received from a user, user device, onboard controller, a remote system and/or other suitable endpoint, and can include any other suitable set of parameters.

Block S100 can include determining an expected power consumption for the trip (e.g., flight). The expected power consumption can be determined based on the trip profile, a power consumption model, and/or other information. In a first variation, the expected power consumption can be determined based on a physical vehicle model, which can be theoretical or empirically determined based on testing data or historical trip data (e.g., for the vehicle, for a fleet of vehicles). In a second variation, the expected power consumption can be selected from a lookup table/chart for the trip profile and/or physical vehicle model. In a third variation, the expected power consumption can be determined based on a machine learning model trained to output expected power consumption. However, the expected power consumption for the trip can be otherwise determined.

Block S100 can include determining the expected heat generation during the trip (e.g., the flight) based on a battery model. The expected heat generation can be: the heat generation rate, heat generated between flight locations, rate of heat generation, and/or other heat generation parameter. The expected heat generation can be: selected (e.g., from a lookup table), calculated (e.g., from an equation, by a battery model, etc.), or otherwise determined. The battery model can be generated based on testing data (e.g., empirical testing for the battery cell, for the battery pack), historical flight data for a given battery pack, a predetermined model (e.g., received from the manufacturer or a battery characterization entity, etc.), or otherwise generated. The battery model can be predetermined, selected for use based on the battery cell type (e.g., class, manufacturer, model, etc.), or otherwise determined. The battery model can determine the expected heat generation based on the starting battery pack temperature (e.g., averaged across all cells, measured at a single temperature sensor for the pack, temperature of the working fluid, etc.), the estimated state of charge (e.g., at takeoff), the state of health (SoH) estimated for a battery pack or each battery cell, an expected power consumption (e.g., total power consumption, as a timeseries, power consumption rate, etc.) for the trip (e.g., determined from an aircraft model or simulation, a lookup table, etc.), battery specifications, and/or any other suitable parameters. In a first variant, the expected heat generation is selected from a lookup table/chart for the given input parameters. In a second variant, the expected heat generation is determined based on a machine learning model trained to output expected power consumption. However, the expected heat generation during the trip (e.g., flight) can be otherwise determined.

Block S100 can include, based on the expected heat generation, determining an expected temperature rise of the battery pack. The temperature rise can be the absolute temperature increase over an entirety of the trip (e.g., flight), a temperature increase for each segment of a mission (e.g., each leg of a flight), a rate of increase, or another parameter. The expected temperature rise can be determined based on: the thermal mass of the battery pack (e.g., specific heat), specific heat of the working fluid (e.g., for a known volume and/or temperature of working fluid), and/or expected heat loss during the trip (e.g., expected heat dissipation to the environment, to a remainder the vehicle, to the cabin, from heat sources/sinks, etc.). The thermal mass of the battery pack can be: empirically determined by testing, theoretically modeled (e.g., calculated), determined based on historical temperature changes during charging and/or discharging, retrieved from a database, and/or otherwise determined. The thermal mass of the battery pack can be: the absolute thermal mass of the battery pack, the available thermal mass of the battery pack (e.g., amount of heat the battery pack can absorb before reaching a maximum battery temperature, discussed below, given the current battery pack temperature and/or estimated battery pack temperature at takeoff), and/or other thermal parameter.

Based on the expected heat rise, Block S100 can optionally include determining an expected temperature difference between the battery cells and the working fluid, which can include: assuming a fixed offset (e.g., same temperature, 2 deg C. difference, etc.), dynamically modelling temperature transience based on material properties and flow rate, using historical/testing data, and/or otherwise determining the expected temperature difference. However, the expected temperature rise of the battery pack and/or cells can be otherwise determined.

Block S100 can include offsetting the expected temperature rise from battery temperature requirement to determine the temperature setpoint. The battery temperature requirement can be a maximum battery (pack or cell) temperature of: >65 deg C., 65 deg C., 60 deg C., 55 deg C., 50 deg C., 45 deg C., 40 deg C., <45 deg C., any range bounded by the aforementioned values, and/or any other suitable temperature. The battery temperature requirement can be determined based on testing data, battery specifications, battery efficiency ranges, battery lifetime (e.g., temperature at which battery starts to degrade), battery SoH, battery SoC, a likelihood of thermal runaway (e.g., at a given state of charge, absolute threshold for a given battery chemistry, battery manufacturer requirement, warranty requirement, etc.), a safety margin, the flight plan (e.g., wherein different battery temperature requirements are selected for each leg of a flight or each flight of a flight series), and/or otherwise determined. In a specific example, the expected temperature change during the flight can be subtracted from the battery temperature requirement to obtain the temperature setpoint.

Block S100 can include adjusting the temperature setpoint of the battery based on the battery SoC (e.g., current SoC, expected SoC at takeoff, expected SoC profile during flight), which functions to reduce or mitigate the risk of thermal runaway propagating at high battery SoC. Adjusting the temperature setpoint can include determining the likelihood of a thermal event at a given SoC and an expected power consumption, determined based on the current SoC, takeoff SoC, cooling rate, rate of thermal redistribution, estimated heat generated during charging, and/or any other suitable parameters. Determining the likelihood of a thermal event can be determined based on a probability of thermal propagation at a particular SoC, a lookup table, a machine learning model, and/or other suitable technique. The likelihood of a thermal event can be predicted once for a trip profile, over a timeseries model of an expected trip profile, periodically for an expected trip profile, for a continuous function approximation of a trip profile/SoC, and/or otherwise predicted. In a first example, the temperature set point for the battery, for a trip of 10 miles, is determined to be 40 deg C. The battery pack has a 95% SoC. Block S100 adjusts the temperature set point down to 30 deg C. to ensure that thermal events are unable to propagate given the high SoC.

Because the vehicle is preferably optimized for low mass and therefore preferably lacks active conditioning equipment, the temperature set point is preferably determined in accordance with calculated temperature change during the trip (e.g., calculated based on the trip profile). However, the temperature set point can be determined based on desired aircraft component temperatures (e.g., wing temperatures, nacelle temperatures, hub temperatures, cabin temperatures), wherein the battery pack(s) can function as heat sources, other component heat generation, and/or other parameters. For example, the trip profile can include the takeoff weight of the vehicle, the trip distance, and the estimated time in flight at each phase of the trip and associated expected power expenditures. In this example, Block S100 can include calculating the discharge characteristics of the battery pack during a flight based on the trip profile (e.g., including a flight plan), and calculating the expected temperature rise during flight and determining a pre-flight temperature set point such that the battery pack temperature remains within a predetermined range (e.g., determined to prevent the occurrence of a thermal event). In related examples, the basis for determining the temperature set point can additionally or alternatively include the vehicle mass (loaded or unloaded), the drag profile of the vehicle, the energy discharge profile, and/or any other suitable predetermined or dynamically determined time-series quantifying aspects of vehicle travel (e.g., a trip).

In a second variant, the temperature setpoint can be heuristically determined (e.g., based on a flight plan).

In a third variant, the temperature setpoint for the battery pack can be predetermined (e.g., absolute maximum, static setpoint, etc.).

In a fourth variant, the temperature setpoint can be determined based on a user input.

In a fifth variant, the temperature setpoint can be determined from a lookup table (e.g., relating flight parameters, such as flight length or aircraft weight, with the temperature setpoint or expected temperature rise).

In a sixth variant, the temperature setpoint can be determined by a trained neural network. However, the temperature setpoint can be otherwise determined.

Figure 14:
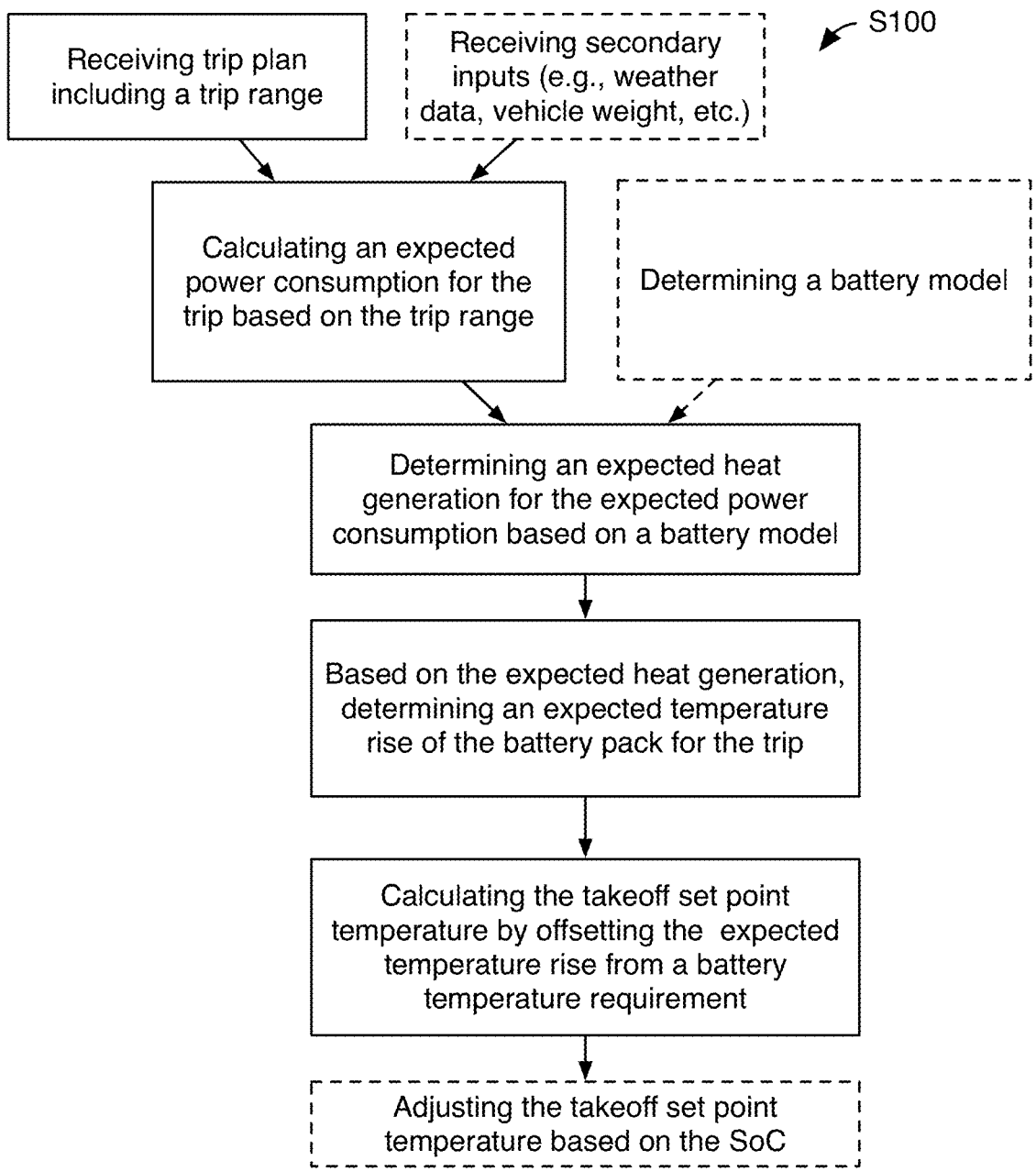
FIG. 14 depicts a flowchart of an example of S100.

In seventh variant, the temperature set point can be determined based on an optimal discharge temperature associated with the particular chemistry of the battery pack (e.g., a temperature or temperature range at which power delivery is maximally efficient. The temperature set point can be equal to the optimal discharge temperature, but can additionally or alternatively be less than the optimal discharge temperature such that the battery pack is at the optimal discharge temperature for a desired time period during the trip (e.g., for a maximized time period, for a time period associated with higher risk vehicle operations such as takeoff and/or landing, etc.) as a result of warming of the battery pack during discharge. However, the temperature set point can additionally or alternatively be otherwise suitably determined. An example of Block S100 is shown in FIG. 14.

In an eighth variant the expected temperature rise can be negative (e.g., a temperature change, a temperature decrease, etc.).

Block S150 includes adjusting the battery pack temperature to the temperature set point. In variants, vehicle operation (e.g., takeoff or flight) can be conditioned on the battery pack temperature satisfying the temperature set point. Block S150 functions to condition the battery pack, which can include heating and/or cooling the battery pack, in order to avoid the need for active temperature control and maximize performance of the battery pack during vehicle operation. The temperature setpoint is preferably the takeoff temperature setpoint, but can additionally or alternatively be the operational setpoint or any other suitable setpoint. Block S150 is preferably performed while the vehicular components (e.g., the battery pack and onboard circulation subsystem) are coupled to the extra-vehicular components (e.g., the offboard circulation subsystem, heat exchanger, offboard pump, etc.), which is preferably prior to vehicle operation on a trip (e.g., flight); however, Block S150 can additionally or alternatively be performed at any other suitable time. S150 is preferably performed during battery pack charging (e.g., to a predetermined SOC), but can additionally or alternatively be performed independent from battery pack charging (e.g., only the battery packs are cooled while the aircraft is grounded; the aircraft takes off only after the takeoff temperature setpoint is reached; etc.).

In variations, Block S150 can include connecting the circulation subsystem to the offboard cooling system, which can be performed manually (e.g., by a user), automatically (e.g., robotic and/or electromechanical connection), and/or otherwise performed.

In variations, Block S150 can include actively circulating working fluid through the combined onboard and offboard circulation subsystem using the offboard pump, such that heat is exchanged between the heat exchanger and the environment (e.g., to accept or reject heat to the environment) and between the battery pack and the working fluid (e.g., to heat or cool the battery pack to the set point temperature). In alternative variations, Block S150 can include allowing the battery pack to passively cool to the temperature of the environment (e.g., wherein the temperature set point is substantially equal to the temperature of the environment and it is determined that the battery pack will passively reach thermal equilibrium with the environment prior to initiation of a trip and operation of the vehicle). In a third variation, S150 can include cooling or warming the battery pack to a charging temperature range, and/or maintaining the battery pack temperature within the charging temperature range, by circulating fluid through the circulation subsystem. In this variation, S150 can optionally include cooling or warming the battery pack to the takeoff temperature setpoint after charging completion.

Figure 12:
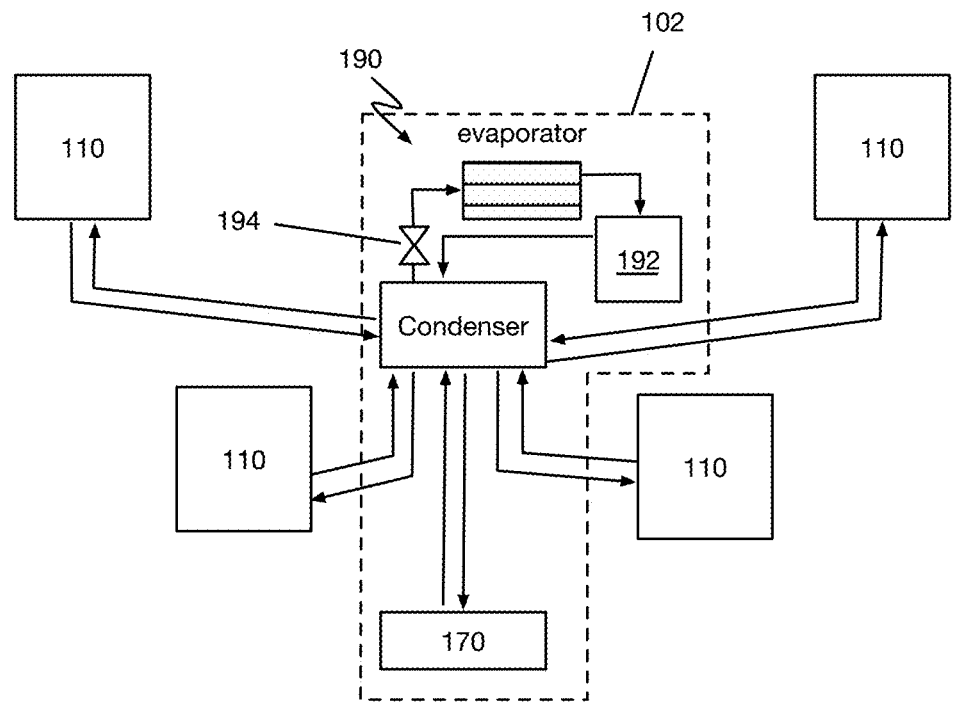
FIG. 12 depicts an example arrangement of a conditioning system.

Block S150 can include controlling the offboard cooling system operation, which may be controlled: at the BMS (e.g., onboard BMS), at the battery electronics, at a vehicle controller, at the charging station, offboard the vehicle, onboard the vehicle, and/or at any other suitable endpoint. Block S150 can include controlling the circulation subsystem (e.g., circulating the working fluid), which can optionally include adjusting a flow rate through the pump (e.g., onboard and/or offboard). Block S150 can include actively circulating the working fluid, and can optionally include (actively) circulating a second working fluid (e.g., refrigerant). Block S150 can include actively removing heat from the working fluid, such as with an offboard refrigeration system (e.g., including a compressor, TXV, evaporator, and condenser; an example is shown in FIG. 12). In a specific example, S150 controls the flow rate of the working fluid during battery conditioning to be substantially the same as a flow rate (e.g., continuous, steady state pump operation, etc.) during the trip (e.g., takeoff, landing, forward flight, etc.).

Figure 8A:
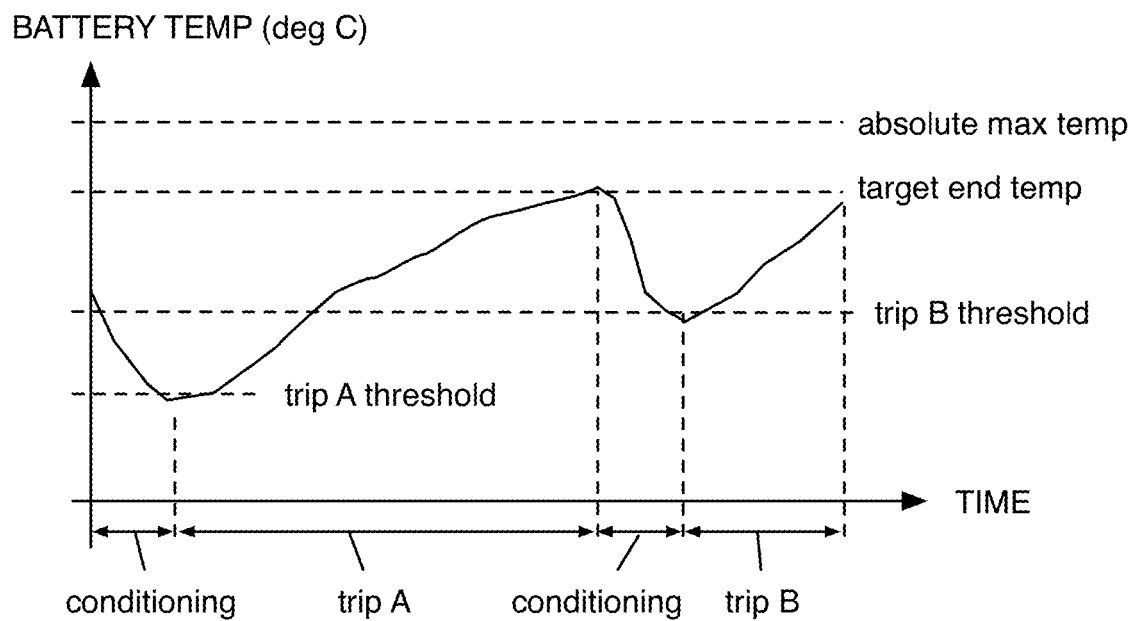
FIGS. 8A and 8B depict a first and second example of a battery temperature profile, respectively.
Figure 8B:
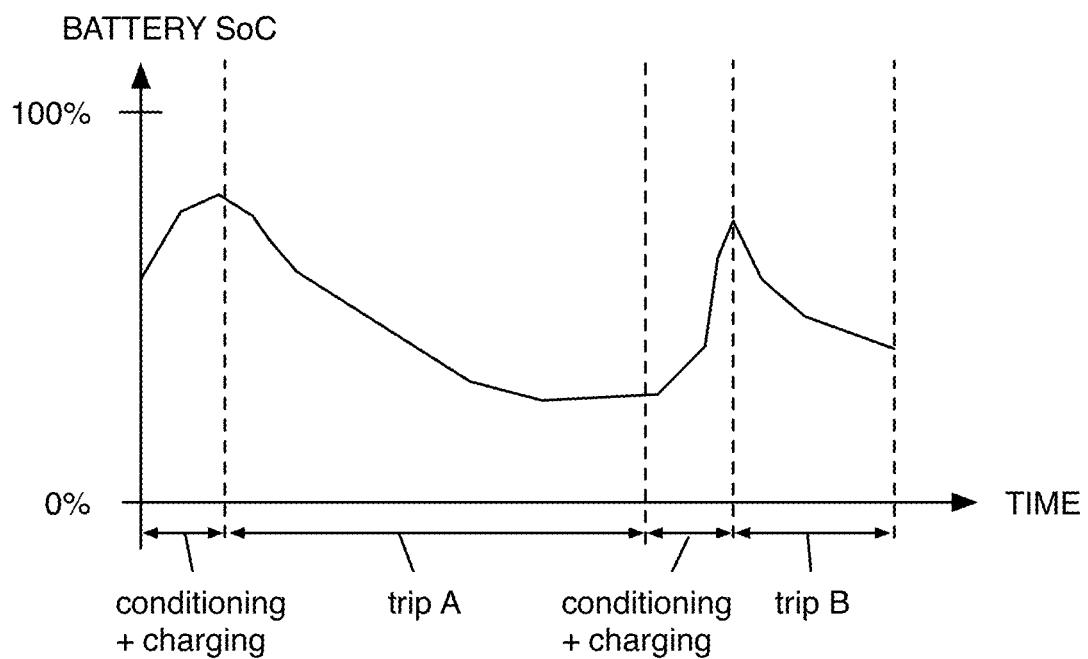

In a specific example, the battery pack temperature can be reduced during cargo (e.g., passenger) loading/unloading and/or battery charging. The turnover time for unloading, loading, battery charging and/or conditioning can be: less than 3 minutes, 5 minutes, 7 minutes, 10 minutes, 12 minutes, 15 minutes, 20 minutes, 35 minutes, 30 minutes, 45 minutes, 1 hour, greater than 1 hour, any range bounded by the aforementioned values, and/or any other suitable turnover time. The temperature decrease during the vehicle turnover time can be: <5 deg C., 5 deg C., 10 deg C., 15 deg C., 25 deg C., 30 deg C., 35 deg C., >35 deg C., any range bounded by the aforementioned values, and/or any other suitable temperature change. In a first example, the battery pack temperature decreases (e.g., continuously, monotonically, etc.) during concurrent charging and conditioning (as shown in the example in FIG. 8A and FIG. 8B). In a second example, the temperature increases and/or remains the same during concurrent charging and conditioning, and subsequently decreases. In a third example, the battery temperature is decreased below the temperature setpoint during conditioning, and then is subsequently held at or below the temperature setpoint during subsequent charging and conditioning.

In a first example, battery charging, concurrent with Block S150 or otherwise, can include: electrically connecting the battery pack to the charger (e.g., via electrical connector), determining a SoC threshold based on the expected power consumption for the trip profile and the battery power capacity, determining satisfaction of a charging condition (e.g., SoC equal to or greater than the SoC threshold), ceasing charging of the battery pack in response to satisfaction of the charging condition, and/or electrically disconnecting the battery pack from the charger.

Figure 15:
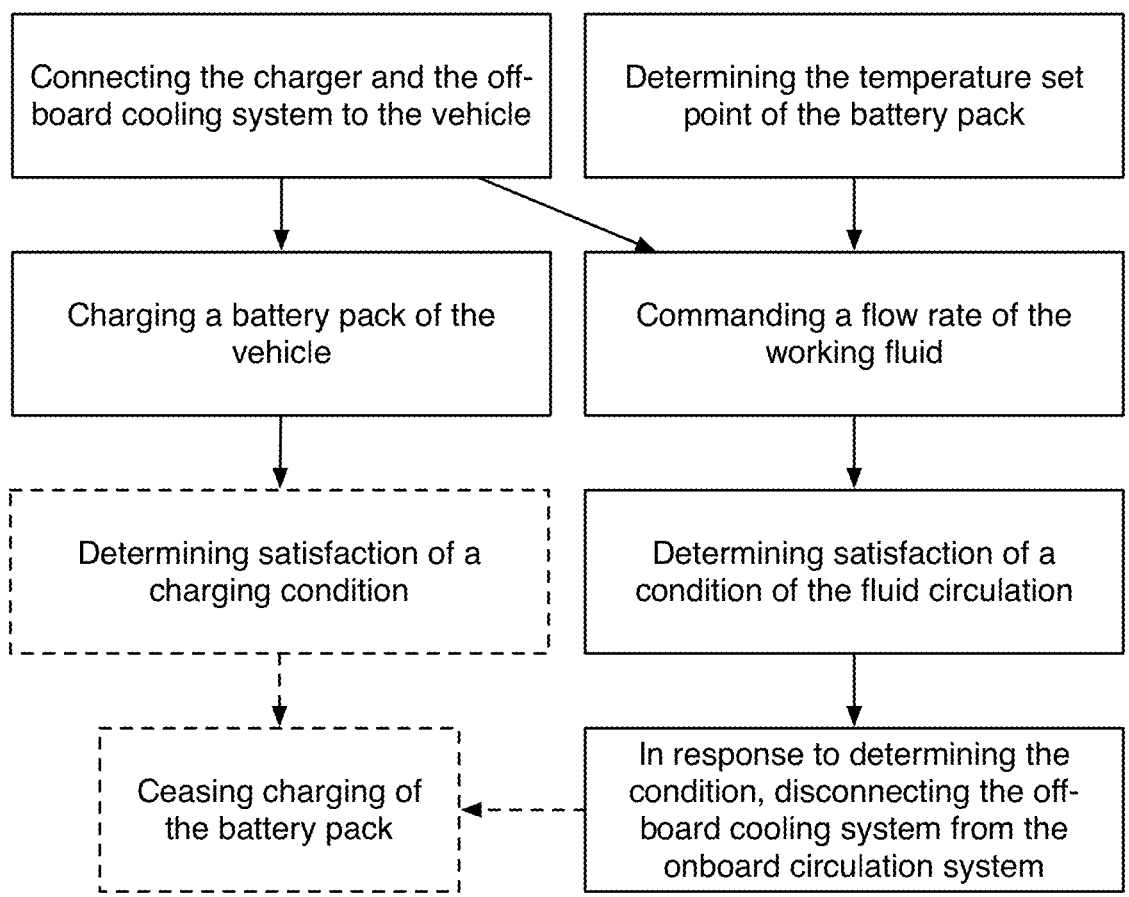
FIG. 15 depicts a flowchart of a variant of the battery thermal management method.

Block S150 can optionally include disconnecting the circulation subsystem from the offboard cooling system, which can occur manually (e.g., by the user) and/or automatically via the lockout mechanism (an example is shown in FIG. 15). In variants of the system including a fluid lockout mechanism, Block S150 can include determining satisfaction of a condition (e.g., decoupling condition) of the fluid circulation (e.g., by the BMS, vehicle controller, charger, or other endpoint) and, in response, disconnecting the offboard cooling system from the onboard cooling system (e.g., at the fluid lockout mechanism). The condition can be: completion of battery conditioning, flow rate mismatch (e.g., between flow rate commanded by the BMS and measured flow rate), flow temperature mismatch (e.g., between expected and measured flow temperature), and/or any other suitable condition of fluid circulation.

Block S200 includes determining the instantaneous temperature of the battery pack. Block S200 functions to determine the temperature of the battery pack for use in adjusting the temperature of the battery pack (e.g., towards a set point temperature as determined in accordance with one or more variations of Block S100, downward to avoid the risk or occurrence of a thermal event, etc.). Block S200 can include directly measuring the instantaneous temperature of the battery pack (e.g., with a temperature sensor), inferring or estimating the temperature of the battery pack (e.g., based on the output of another sensor that is not a temperature sensor, in accordance with a thermal model of the battery pack, etc.), calculating the temperature of the battery pack (e.g., based on the output power of the battery pack), and/or otherwise suitably determining the temperature. The temperature determined can be the temperature at a physical point within the battery pack (e.g., an arbitrary point, a point coupled to a sensor input, etc.), a temperature distribution (e.g., three dimensional distribution) within the battery pack (e.g., at a cell-by-cell resolution, at a finer or coarser resolution than cell-by-cell, etc.), the rate of temperature change of a point within the battery pack, the distribution of the rate of temperature change within the battery pack, and/or any other suitable quantification or derivative quantity of temperature.

Block S200 can be performed during battery conditioning (e.g., in accordance with one or more variations of Block S150); for example, the instantaneous temperature of the battery pack can be measured to determine whether the battery pack has reached the determined temperature set point. Block S200 can also be performed during vehicle operation (e.g., flight, driving, traversing water, etc.); for example, Block S200 can include monitoring the temperature and/or temperature-related data to determine the thermal state of the battery pack during use.

Block S200 can include detecting a thermal event. Detecting a thermal event can include determining that the temperature and/or temperature rise rate has exceeded a threshold value, based on a temperature or temperature change rate measurement. Block S200 can include inferring a thermal event, based on a signal that is indicative of a thermal event (e.g., a current spike or dropout, a power fluctuation, etc.) in addition to or alternatively to a direct measurement of the temperature or other fire detection measures (e.g., smoke detector, fire rope, etc.). For example, Block S200 can include detecting propagation of a thermal anomaly between multiple cells in the battery pack based on the measured temperature rise rate in a plurality of adjacent cells. In another example, Block S200 can include detecting a thermal event in a battery pack based on an output current dropout resulting from an internal short circuit. However, Block S200 can include otherwise suitably detecting a thermal event.

Block S200 can include predicting a thermal event. A thermal event can be predicted based on a thermal model of the battery pack, and Block S200 can include determining that a thermal event is likely to occur (e.g., associated with a quantifiable probability above a threshold value) based on vehicle operational data (e.g., flight data, trip data, etc.). For example, Block S200 can include predicting that a thermal runaway is likely based on flight data indicating an emergency landing has occurred (e.g., a shock sensor reading, a message from a flight computer, etc.).

Figure 16:
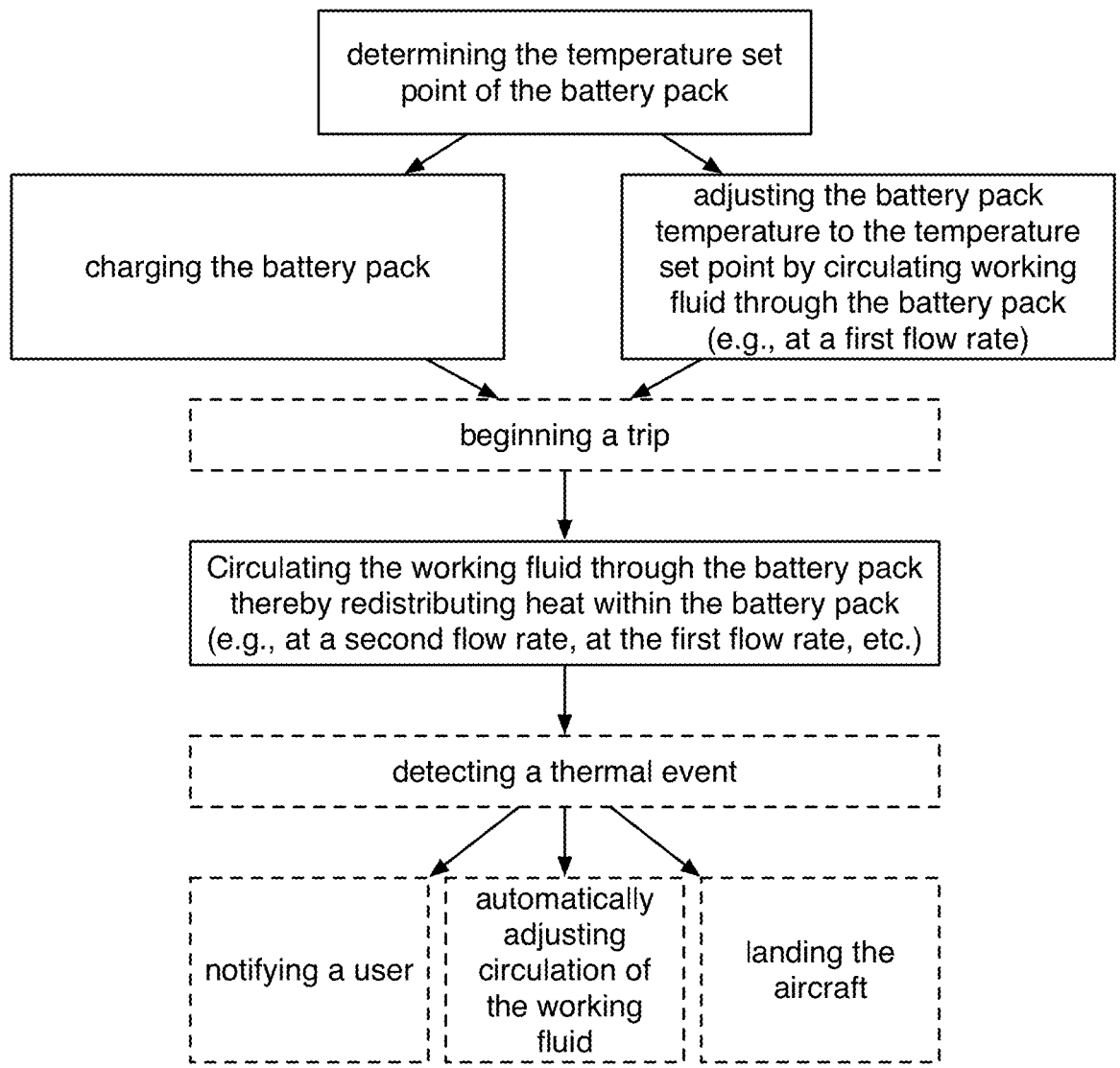
FIG. 16 depicts a flowchart of a variant of the battery thermal management method.

Block S200 can optionally include notifying a user, pilot, remote server, third party of thermal event and/or a current temperature. Notification can occur: with any suitable timing, which can be before the trip, during conditioning, during battery charging, during the trip (e.g., periodically, continuously, etc.), in response to thermal event detection, and/or with any other suitable timing. An example is shown in FIG. 16.

Block S200 can optionally include controlling the vehicle based on the temperature, which can include: continuing the trip plan execution if the temperature is within a predetermined temperature range (e.g., below absolute battery max, within threshold deviation from expected temperature profile, no current thermal event, etc.), in response to the temperature exceeding a threshold: reducing/cutting power draw from a battery pack, executing an emergency landing, dynamically adjusting the trip plan during the trip, and/or otherwise controlling the vehicle.

Block S200 can additionally or alternatively include determining a thermal event in any other suitable manner.

Block S250 includes redistributing heat within the battery pack based on the temperature of the battery pack. Block S250 functions to utilize the thermal mass of the battery pack as a whole to absorb excess heat resulting from a thermal event in a portion of the battery pack. Block S250 can also function to achieve temperature uniformity within the battery pack. Block S250 can also function to prevent the occurrence of a thermal event (e.g., transport heat away from a malfunctioning cell to prevent a thermal runaway) and/or the worsening of a thermal event (e.g., transport heat away from a cell experiencing thermal runaway to prevent propagation). S250 can be performed by the onboard pump, offboard pump, and/or any other suitable pump.

Block S250 can include controlling a flow rate of an onboard pump that is operable to circulate working fluid through a closed, onboard portion of the onboard circulation subsystem. Block S250 can include determining the flow rate based on received data (e.g., thermal event data, flight data, trip data, etc.) and controlling the onboard pump (e.g., by way of a pump controller) to implement the determined flow rate.

Block S250 is preferably performed during vehicle operation away (e.g., and decoupled) from the infrastructure installation, and thus preferably does not include active conditioning of the battery pack (e.g., to cool the battery pack as a whole, to warm the battery pack as a whole) but rather preferably includes redistributing the heat of the battery pack across the thermal mass of the battery pack (e.g., transporting excess heat from one cell to another cell or cells which are at or below a nominal temperature). However, Block S250 can additionally or alternatively include exchanging heat between the onboard system and the environment (e.g., through a radiator section of the onboard circulation subsystem) without the use of a dedicated, high-throughput heat exchanger such as that integrated with the infrastructure installation.

Block S250 can be performed in response to a detected thermal event or other system failure, as a mechanism for failsafe and/or failure-tolerant operation of the vehicle. For example, Block S250 can include operating the onboard pump at a maximum flow rate in response to a detected thermal event.

Block S250 can be performed based on contextual data. For example, the contextual data can include flight information such as altitude and an estimated time period and power profile required before executing an emergency landing, and Block S250 can include determining a maximum allowable flow rate based on the remaining energy in the battery pack (to power the onboard pump) and the contextual data, and operating the onboard pump at the determined maximum allowable flow rate. In a related example, Block S250 can include preventing activation of the onboard pump in spite of the occurrence of a thermal event in cases wherein onboard energy would be better utilized in powering propulsion systems (e.g., enabling an aircraft to land safely even while sustaining damage to the battery pack).

Block S250 can be performed based on a predicted thermal event. For example, Block S250 can include pre-emptively operating the onboard pump at a maximum flow rate in response to a prediction that a thermal runaway is probable (e.g., based on detection of a hard landing, the output of a shock sensor, an emergency switch being activated by a vehicle operator, etc.).

Block S250 can optionally include detecting a leak in the circulation subsystem. Block S250 can, in response to detecting a leak, automatically stop the pump to minimize the amount of fluid loss and/or likelihood of electrical shorting, sending a notification (e.g., to a user within the aircraft, a pilot, a central management system, etc.), or otherwise mitigate leak-caused failures. Leak detection can make use of resistive, capacitive, and/or optical sensors, and/or any other suitable set of sensors. Leaks can be detected as: loss of working fluid volume from the fluid envelope (e.g., based on a time series of sensor measurements) above a predetermined loss threshold (e.g., 0.5 L, 1 L, etc.), a change in the working fluid resistivity (e.g., increase, decrease), detecting an open circuit (e.g., by running current through the working fluid), and/or otherwise determined.

In a first variant, Block S250 does not remove substantial amounts of heat from the thermal system cooperatively defined by the battery pack and circulation subsystem during the trip. In a first example, less than 50%, 25%, 10%, 5%, 3%, 1%, of generated heat (or total heat) is rejected during the trip.

In a second variant, Block S250 does not remove substantial amounts of heat from the battery pack and/or vehicle system during the trip. In a first example, less than 10%, 5%, 1%, of generated heat, or total heat is removed during the trip. In a second example, the temperature of the battery pack (e.g., net temperature, highest individual cell temperature, etc.) increases monotonically (e.g., rate of temperature change can be uniform or non-uniform, but is strictly greater than zero; continuously; etc.) during the trip. In a third example, the thermal energy contained within the thermal system of the battery pack and working fluid increases continuously (e.g., rate of temperature change can be uniform or non-uniform, but is strictly greater than zero) during the trip.

In a third variant, Block S250 removes heat from the battery pack and/or vehicle system during the trip.

In a fourth variant, Block S250 redistributes heat continuously during a trip. In a specific example, the working fluid is circulated at a max flowrate (e.g., absolute maximum, maximum continuous flowrate) of the pump, onboard heat exchanger, and/or fluid manifold (or envelope). In a second specific example, the flow rate of circulation during the trip is substantially the same circulation during battery conditioning, such as within 50%, within 25%, within 10%, within 5%, within 3%, within 1%, exactly the same, and/or otherwise equivalent.

In a first specific example, active heating and/or cooling includes applying mechanical work to a working fluid in order to create a steady state temperature difference (e.g., of greater than: 5 deg C., 10 deg C., 15 deg C., 20 deg C., 25 deg C., 50 deg C., etc.) between the working fluid and the battery pack. In a second specific example, there is no active heat removal and/or active cooling of the battery pack during a trip, and there is active heat removal and/or active cooling of the battery after the trip. In a third specific example, there is no active cooling of the collective thermal system of the battery pack and the circulation subsystem (e.g., including the fluid manifold and the volume of working fluid onboard the aircraft). In the third specific example, there is no forced convection between the environment and the collective thermal system including the battery pack and the circulation subsystem (e.g., heat exchange limited to radiation, natural convection, and conduction).

Although omitted for conciseness, the preferred embodiments include every combination and permutation of the various system components and/or method Blocks, which can be combined in any suitable permutation or combination and/or omitted in whole or in part from variations of the preferred embodiments.

As a person skilled in the art will recognize from the previous detailed description and from the figures and claims, modifications and changes can be made to the preferred embodiments of the invention without departing from the scope of this invention defined in the following claims.

What is claimed is:

1. A system for an electric aircraft, the system comprising:
   a battery pack onboard the electric aircraft; and
   a circulation loop onboard the electric aircraft, the circulation loop comprising:
     an onboard heat sink thermally coupled to the battery pack;
     an onboard circulation system comprising:
       a distribution manifold fluidly connected to the onboard heat sink;
       a working fluid; and
       a pump connected to the distribution manifold and configured to continuously circulate the working fluid through the onboard heat sink during aircraft flight;

wherein the onboard circulation system does not comprise an onboard compressor; and a coupling configured to selectively connect the distribution manifold to an offboard cooling system, the offboard cooling system configured to transfer heat from the working fluid to a sub-ambient cooling loop comprising an offboard compressor, wherein the circulation loop and the battery pack are configured to cooperatively store more than a threshold percentage of thermal energy generated by the battery pack during aircraft flight.

2. The system of claim 1, wherein the working fluid is circulated through the offboard cooling system during charging the battery pack.

3. The system of claim 2, wherein the working fluid is circulated at a first rate during flight, and wherein the working fluid is circulated at a second rate substantially equal to the first rate while charging the battery pack.

4. The system of claim 1, wherein the working fluid is circulated at a maximum continuous flow rate of the pump during flight.

5. The system of claim 1, wherein the offboard cooling system cools the battery pack to or below a takeoff temperature during battery charging.

6. The system of claim 1, wherein a temperature of the battery pack monotonically increases during aircraft flight.

7. The system of claim 1, further comprising a second heat sink, the second heat sink comprising:
a reservoir fluidly connected to the onboard heat sink by the distribution manifold; and
a volume of the working fluid contained within the reservoir.

8. The system of claim 1, wherein the onboard heat sink comprises a chill plate.

9. The system of claim 1, wherein the battery pack comprises a first cell and a second cell, wherein the onboard heat sink thermally connects the first cell with the second cell and is configured to transfer heat from the first cell to the second cell.

10. The system of claim 9, wherein the first cell and the second cell are adjacent and are thermally insulated from each other.

11. The system of claim 1, further comprising:
a second battery pack; and
a second heat sink thermally coupled to the second battery pack and fluidly connected to the onboard circulation system;

wherein the pump is redundantly powered by the first and second battery packs.

12. The system of Claim ii, wherein the pump is arranged between the first and second battery packs.

13. The system of claim 1, further comprising:
an onboard battery management system (BMS) configured to command a flow rate of the working fluid during a battery charging mode and aircraft flight; and
a fluid lockout mechanism selectively separating the onboard circulation system from the offboard cooling system during the battery charging mode.

14. The system of claim 1, wherein the onboard heat sink comprises a thickness of less than three millimeters.

15. The system of claim 1, wherein the battery pack generates thermal energy with a thermal power, wherein the circulation loop and the battery pack cooperatively store a first portion of the thermal power and reject a remainder of the thermal power, wherein the first portion is larger than the remainder.

16. The system of claim 1, wherein the threshold percentage is 80 percent.

17. A system for an electric aircraft, the system comprising:
a battery pack onboard the electric aircraft; and
a circulation loop onboard the electric aircraft, the circulation loop comprising:
an onboard heat sink thermally coupled to the battery pack;
an onboard circulation system comprising:
a distribution manifold fluidly connected to the onboard heat sink;
a working fluid; and
a pump connected to the distribution manifold and configured to continuously circulate the working fluid through the onboard heat sink during aircraft flight;
wherein the onboard circulation system does not comprise an onboard compressor; and
a coupling configured to selectively connect the distribution manifold to an offboard cooling system, the offboard cooling system configured to transfer heat from the working fluid to a sub-ambient cooling loop comprising an offboard compressor,
wherein a temperature of the battery pack monotonically increases during aircraft flight.

* * * * *